(12) United States Patent
Pittman

(10) Patent No.: US 10,482,790 B1
(45) Date of Patent: Nov. 19, 2019

(54) TEACHING AID FOR TEACHING THE PRINCIPLES OF AN IMPULSE DRIVER

(71) Applicant: Theodore N. Pittman, Brooklyn, NY (US)

(72) Inventor: Theodore N. Pittman, Brooklyn, NY (US)

(*) Notice: Subject to any disclaimer, the term of this patent is extended or adjusted under 35 U.S.C. 154(b) by 47 days.

(21) Appl. No.: 15/941,211

(22) Filed: Mar. 30, 2018

Related U.S. Application Data

(63) Continuation-in-part of application No. 14/545,635, filed on May 23, 2014, now abandoned.

(51) Int. Cl.
| | | |
|---|---|---|
| *F03G 3/00* | (2006.01) | |
| *F16H 27/04* | (2006.01) | |
| *G09B 23/10* | (2006.01) | |
| *G09B 9/00* | (2006.01) | |

(52) U.S. Cl.
CPC .............. *G09B 23/10* (2013.01); *F03G 3/00* (2013.01); *G09B 9/00* (2013.01)

(58) Field of Classification Search
CPC .............. G09B 23/10; G09B 9/00; F03G 3/00
USPC .......................................................... 74/84 S
See application file for complete search history.

(56) References Cited

U.S. PATENT DOCUMENTS

| | | | | |
|---|---|---|---|---|
| 2,886,976 A | | 5/1959 | Dean | |
| 3,203,644 A | * | 8/1965 | Kellogg, Jr. ........... | G01C 19/04 180/7.1 |
| 3,258,979 A | * | 7/1966 | Alsept ................... | G09B 23/10 185/29 |
| 3,492,881 A | * | 2/1970 | Vanden Auweele .... | F16H 33/00 74/84 S |
| 3,555,915 A | | 1/1971 | Young | |
| 3,968,700 A | | 7/1976 | Cuff | |
| 4,784,006 A | | 11/1988 | Kethley | |
| 4,991,453 A | | 2/1991 | Mason | |
| 5,024,112 A | | 6/1991 | Kidd | |
| 5,054,331 A | | 10/1991 | Rodgers | |

(Continued)

FOREIGN PATENT DOCUMENTS

WO    WO2007097711    8/2007

OTHER PUBLICATIONS

Hartog, J.P. Den, "Mechanics," McGrawhill. ISBN 0-486-60754-2, 1961, Chapter 10, Example b, p. 186.

(Continued)

*Primary Examiner* — Jake Cook
(74) *Attorney, Agent, or Firm* — Hanrahan Law Firm P.A.; Benjamin M. Hanrahan

(57) ABSTRACT

An educational tool for teaching principles of parametric resonance, linear force and angular momentum is presented herein. The tool includes a frame having a spindle assembly with a shaft. The upper end of the shaft is connected to an upper coupling and the lower end of the shaft is connected to a lower coupling. A turntable is positioned below the shaft and includes an offset mounting pin extending from a top surface thereof. Furthermore, a weight assembly is positioned through a hole in the shaft via an axle, wherein the axle is rotatable about a longitudinal axis of rotation within the axle hole of the shaft. The upper motor will rotate the shaft in one direction, while the lower motor rotates the turntable in a second, opposite direction causing the weight assembly to rotate and oscillate about the longitudinal axis with a varying moment of inertia.

12 Claims, 18 Drawing Sheets

(56) References Cited

U.S. PATENT DOCUMENTS

| | | | |
|---|---|---|---|
| 5,090,260 | A | 2/1992 | Delroy |
| 5,860,317 | A * | 1/1999 | Laithwaite ............... F03G 3/00 |
| | | | 74/5.34 |
| 6,345,789 | B1 | 2/2002 | Rasmusson |
| 6,745,980 | B2 | 6/2004 | Neff |
| 6,860,166 | B2 | 3/2005 | Hintz |
| 7,121,159 | B2 | 10/2006 | Tippett |
| 7,375,436 | B1 | 5/2008 | Goldin |
| 7,832,297 | B2 | 11/2010 | Hewatt |
| 7,900,874 | B2 | 3/2011 | Fiala et al. |
| 8,434,379 | B2 | 5/2013 | Romano |
| 8,491,310 | B2 | 7/2013 | Gutsche |
| 2002/0148308 | A1 | 10/2002 | Rush |
| 2004/0115594 | A1 * | 6/2004 | Schoendorff .......... G09B 23/10 |
| | | | 434/67 |
| 2005/0109138 | A1 * | 5/2005 | Tavarez ................... F03G 3/06 |
| | | | 74/84 S |
| 2005/0160845 | A1 * | 7/2005 | Keefe ...................... F03G 3/08 |
| | | | 74/84 S |
| 2006/0060013 | A1 * | 3/2006 | Robinson ............... B64C 39/00 |
| | | | 74/84 S |
| 2009/0014249 | A1 | 1/2009 | Sin |
| 2011/0156396 | A1 | 6/2011 | Cleveland |
| 2011/0185840 | A1 | 8/2011 | Firmage |
| 2011/0219893 | A1 | 9/2011 | Fiala et al. |
| 2013/0081884 | A1 * | 4/2013 | Li ............................ F03G 3/00 |
| | | | 180/2.2 |
| 2017/0077782 | A1 * | 3/2017 | Yamano ................... F03G 3/00 |
| 2017/0321664 | A1 * | 11/2017 | Robbins ................... F03G 3/00 |

OTHER PUBLICATIONS

Sarrett, John and Tagg, Randall, "Control of a Chaotic Parametrically Driven Pendulum," Dept of Physics, University of Colorado, 1994.

Weeks, Eric R. and Burgess, John M., "Evolving artificial neural networks to control chaotic systems," Dept of Physics, University of Texas at Austin, 1997.

Poliskov, Spartak M., et al., "Gravitonics is Electronics of the XXI Century," Magazine-Electronics: Science, Technology, Business, Jul.-Aug. 2002, 8-13 pfs, Issue #4.

Ohtaa, Ken, "Analysis of Hammer Movement Based on a Parametrically Excited Pendulum Model," Japan Institute of Sports Science, 3-5-1 Nishigaoka, Kita, Tokyo, Japan, 2010.

Meriam, J.L. and Kraige, L.G., "Engineering Mechanics: Dynamics," 6th Ed. John Wiley & Sons: New Jersey. ISBN-13:978-0470499788. Chap 7, p. 575-578, 2010.

Provatidis, Christopher G., "A device that can Produce Net Impulse Using Rotating Masses," Article in Engineering, 2010.

Holzner, Steven, PhD, "Physics for Dummies," New Jersey, Wiley Publishing. ISBN: 978-470-90324-7. Chap.12, p. 234, 2011.

Holzner, Steven, PhD, "Physics for Dummies," New Jersey, Wiley Publishing. ISBN: 978-470-90324-7. Chap. 7, p. 136, 2011.

Holzner, Steven, PhD, "Physics for Dummies," New Jersey, Wiley Publishing. ISBN: 978-470-90324-7. Chap. 12, p. 240, 2011.

Manning, Jeane, "Space, Propulsion & Energy Sciences International Forum—A Journalist's Notes," Forum, May/Jun. 2012, Issue 103, 18 to 23 pgs, Infinite Energy.

Wagh, Sanjay M., Deshpande, Subodh S., "Hammer Throwing: Role of the Action of Athelete," Central India Research Institute, Nagpur, India, 2014.

Butikov, Eugene I. "Simulations of Oscillatory Systems," ISBN-13:978-1-4987-0768-8 Dept of Physics, Saint Petersburg University, Saint Petersburg, Russia, 2015.

Butikov, Eugene I. "Simulations of Oscillatory Systems," ISBN-13:978-1-4987-0768-8, p. 216, Dept of Physics, Saint Petersburg University, Saint Petersburg, Russia, 2015.

Solomon, Benjamin T., "Does the Laithwaite Gyroscope Weight Loss have Propulsion Potential?" Critique, ISETE LLC, 48 pgs. unk date, unk publisher, CO, USA.

* cited by examiner

Top View

Not to scale

Pivot Encoder Logic $$h = \ell \cos\theta \sin\phi + h_s$$

TEACHING AID FOR TEACHING THE PRINCIPLES OF AN IMPULSE DRIVER

CLAIM OF PRIORITY/CROSS REFERENCE TO RELATED APPLICATIONS

The present application is a continuation-in-part patent application of previously filed patent application Ser. No. 14/545,635 filed on May 23, 2014, now abandoned.

FIELD OF THE INVENTION

The present invention is generally directed to an impulse driver and educational device or teaching aid for teaching principles related to generating a linear force using gravity, angular momentum, and torque to oscillate a pendulous mass or weight assembly. Textbook references, calibration procedures and a testing checklist are provided to aid teachers and educators within the scope of the present invention.

BACKGROUND OF THE INVENTION

There are many physical problems which seem to be quite simple although the corresponding mathematical models are rather complicated to be studied, analyzed and solved. Computer simulations are often used and, in some classrooms or educational facilities, computer graphics and mathematical representations may be the only experiences or devices to which students are exposed. Therefore, there is a need for dynamic teaching aids that allow students to interact with the physical world and increase their intuitive understanding.

Particularly, it should be noted that, in 1794 Rev. George Atwood invented an apparatus known as an "Atwood Machine." See (Tipler, Paul A. (1991), *Physics for Scientist and Engineers, Third Edition, Extended Version*. New York: Worth Publishers. ISBN 0-87901-432-6. Chapter 6, example 6-13, page 160). The "Atwood Machine" was the first reasonably successful invention of an inertial mass motion teaching aid. It consists of two bodies attached to opposite ends of a massless inextensible wire wound round a massless frictionless pulley. Each body can move only along a vertical axis.

The proposed invention can be considered a modified "Atwood Machine". It was chosen because it is a simple mechanical system with one degree of freedom and can easily show a body's acceleration by: $a=(m2-m1)/(m2+m1) g$, where m1 and m2 are the body's mass and g is the gravitational acceleration.

The proposed invention disclosed herein is used to visually demonstrate the net linear motion of the frame of an Impulse Driver, where m1 is the mass of the Impulse Driver and m2 is a mass of a counterweight, which in some embodiments, can be, but is not limited to, a container of sand, for example. The mass of the Impulse Driver and the mass of the counterweight in some embodiments and implementations can be of equal weight. Additionally two pulleys are used to avoid any contact between the Impulse Driver and the counterweight.

Persons knowledgeable of Atwood Machines will be familiar with a similar mechanism known as a Swinging Atwood Machine (Moody, Parker W. (2013). "Modeling a Swinging Atwood Machine," *Journal of the Advanced Undergraduate Physics Laboratory Investigation*: Vol. 1:Iss. 1, Article 1) where one of the masses is allowed to swing in a two-dimensional plane, producing chaotic motions for some system parameters and initial conditions.

The Impulse Driver of at least some embodiments of the present invention is mechanically restrained from swinging away from the vertical by four (or other number of) guide posts placed concentrically around the frame.

SUMMARY OF THE INVENTION

The Impulse Driver of the present invention uses gravity and angular momentum to create a linear force by impulses for driving a carrier. Accordingly, topics that can be studied using the Teaching Aid for Teaching the Principles of an Impulse Driver include: angular momentum, conservation laws, frames of reference, friction, jerk/impulse, kinetic and potential energy, Lagrangian mathematics, moment of inertia, Newton's 1st, 2nd, 3rd laws, precession, torque, vectors, work and energy.

Specifically, in at least one embodiment, the present invention includes a physical teaching aid for teaching a mechanical method and mathematical foundations for generating a linear impulse from oscillating pendulous masses. The device or teaching aid may include hardware for students to experiment with so they may get a more intuitive understanding of the interaction of forces required to generate linear motion from oscillating pendulous masses.

The device of at least one embodiment is capable of producing cyclical impulses observable and measurable by a user, such as a student or student body. The present invention may be used to provide a cost effective teaching aid for demonstrating principles of parametric control of an oscillating pendulous mass, and to provide support structures, electronics and sensing for monitoring and recording experiments of oscillating eccentric masses.

Before going to the checklists, the instructor should review the mathematical foundations for the Impulse Driver's operation. All motion should be considered from the point of view of the center of mass 80 (CM) of the disk.

There are four analogical ideas and accompanying math to consider.
1. Generation of an angular momentum field.
2. Helical "Hammer throw" mathematics.
3. Parametric resonance "pumping"
4. Vertical net linear motion generation.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

The present embodiment is not intended to be the only materials and methods for applying the invention. However, this embodiment has been successfully tested and represents the principles of the educational tool and/or Impulse Driver 10.

Figure 1:
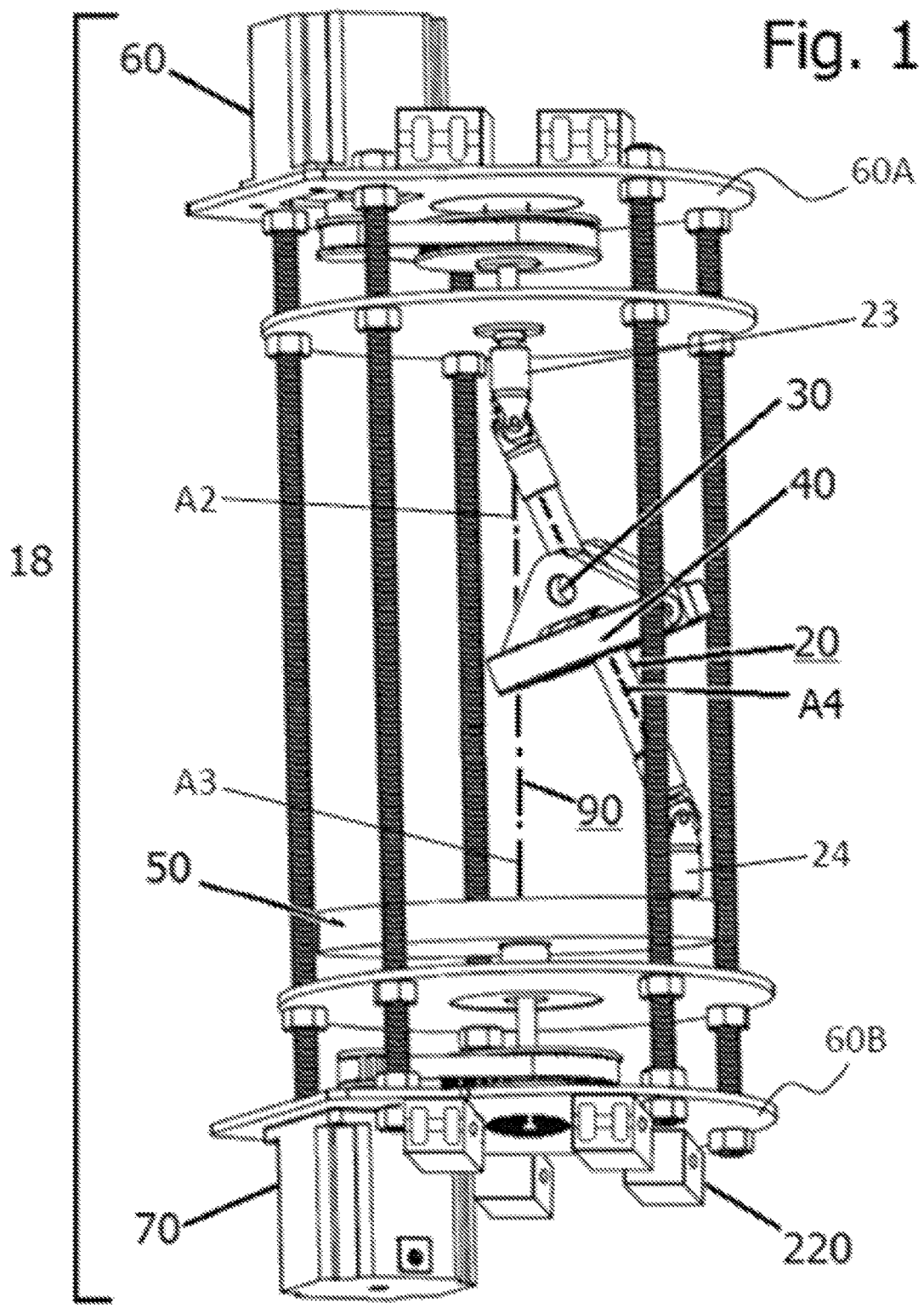
FIG. 1 is a front and partially perspective view of the Impulse Driver of at least one embodiment of the present invention.
Figure 9:
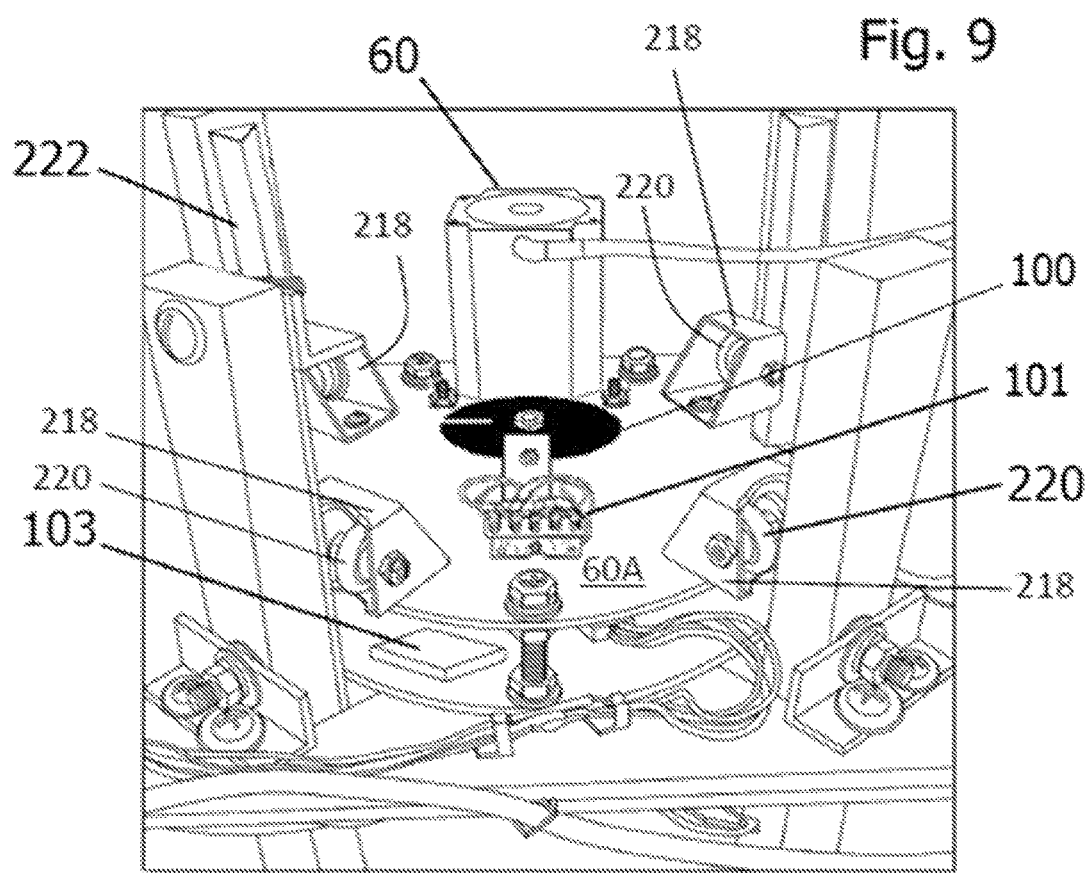
FIG. 9 is a partial detail view of upper motor assembly 12.

Specifically, FIG. 1 represents an assembled view of at least a portion of the educational tool and/or Impulse Driver 10 of at least one embodiment of the present invention. In this illustration, the Impulse Driver 10 includes a frame 18, motors (such as an upper motor 60 and lower motor 70), spindle assembly 20, a weight assembly 40, and a turntable 50. FIG. 9 illustrates another view showing details of the upper portion of the Impulse Driver 10 of at least one embodiment.

Figure 2:
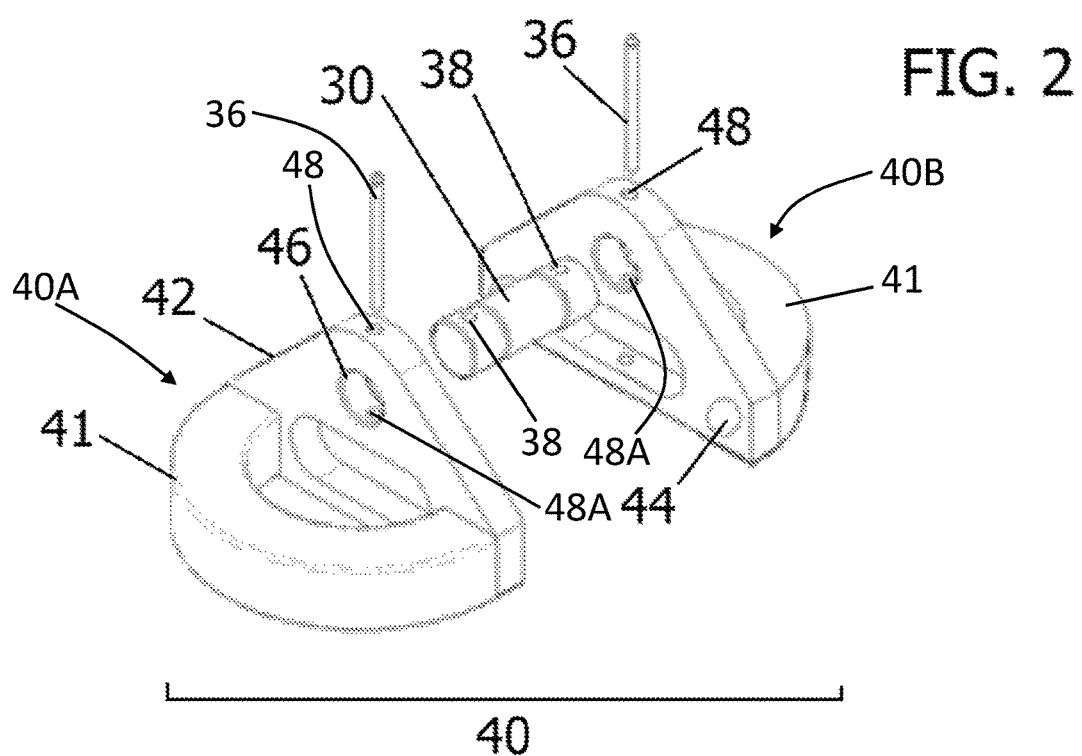
FIG. 2 is a perspective and partially exploded view of a pendulous mass or weight assembly as disclosed in accordance with at least one embodiment herein.

FIG. 2 is a perspective and at least partially exploded view of the weight assembly 40 of at least one embodiment of the present invention. In particular, the weight assembly 40 of one embodiment includes two halves or two portions 40A, 40B and one axle 30. Each half or portion 40A, 40B of the weight assembly 40 has weighted or heavy members 41. In some cases, the weights or heavy members 41 are configured or structured in a semicircular manner, as represented in FIG. 2, for example, however, other embodiments may include weights or heavy members 41 of different shapes, sizes and configurations.

Furthermore, still referring to FIG. 2, the weights or heavy members 41 of each portion 40A, 40B may be connected to a corresponding support 42, such as a support plate or frame, for example. In particular, one or more screws or other fasteners (not shown) may pass through the support 42 (e.g., via mounting hole(s) 44) and into engagement with the corresponding weighted member 41. In such an embodiment, the weights or heavy members 41 are easily replaced, for example, by removing or loosening screws. This may be done using an Allen-wrench, screwdriver, or other tool, which, in some cases, may be shortened to fit between supports 42A and 42B. In some cases, screws, such as Allen-screws, can be countersunk.

It should be noted, however, that in other embodiments or implementations, the weighted member(s) 41 may be connected or mounted to the support(s) 42 in other ways, including via adhesion. It is also contemplated that the weighted member 41 and corresponding support 42 are integral with one another, or otherwise constructed as a single piece.

Moreover, the supports 42 of at least one embodiment may each have an axle hole 46 for mounting to or connecting with an axle 30, such as, at opposite ends of an axle 30. In some cases, the axle 30 may be fixedly mounted or otherwise secured to the supports 42 via one or more axle pins 36. For instance, as represented in FIG. 2, the axle pins 36 may pass through corresponding holes 48 and continue through axle pin holes 38 located on the axle 30. The axle pins 36 may continue into rotor support 42 again, for example, into holes 48A. Other connection mechanisms or mounting assemblies are contemplated in order to attach or connect the two portions 40A and 40B of the weight assembly 40. In at least one embodiment, however, for example, in the embodiment illustrated in FIG. 2, the fixed attachment of the portions 40A and 40B to the axle 30 ensures that both portions 40A and 40B move as a single unit or as one pendulous mass.

In addition, the two portions 40A and 40B of the weight assembly 40 are at least partially spaced from one another when assembled, e.g., with the axle disposed between them. As will be apparent throughout the description provided herein, this allows the weight assembly 40 to rotate about a longitudinal axis without being obstructed by a shaft 25 of a spindle assembly 20, shown in FIGS. 1 and 3, for example.

Further, the present invention may come with different weight assemblies 40 or different weighted members or rotors 41, each having different masses or weights. In this manner, the weight assembly 40 can be swapped out for a different assembly having a different overall weight or mass. In other embodiments, the rotors or weighted members 41 may be swapped out or replaced, leaving the remainder of the weight assembly 40 (e.g., the axle 30, supports 42, pins 36) in place. For instance, in an exemplary situation, three sets of rotors or weighted members 41 may be included, which is helpful for a teaching scenario. For instance, each of the rotors 41 may have identical, or at least substantially similar, geometries. In some cases, one rotor set may be made of aluminum (density: 2830 kg/m^3), another out of steel (density: 7250), and yet another out of bronze (density: 8900).

Figure 3:
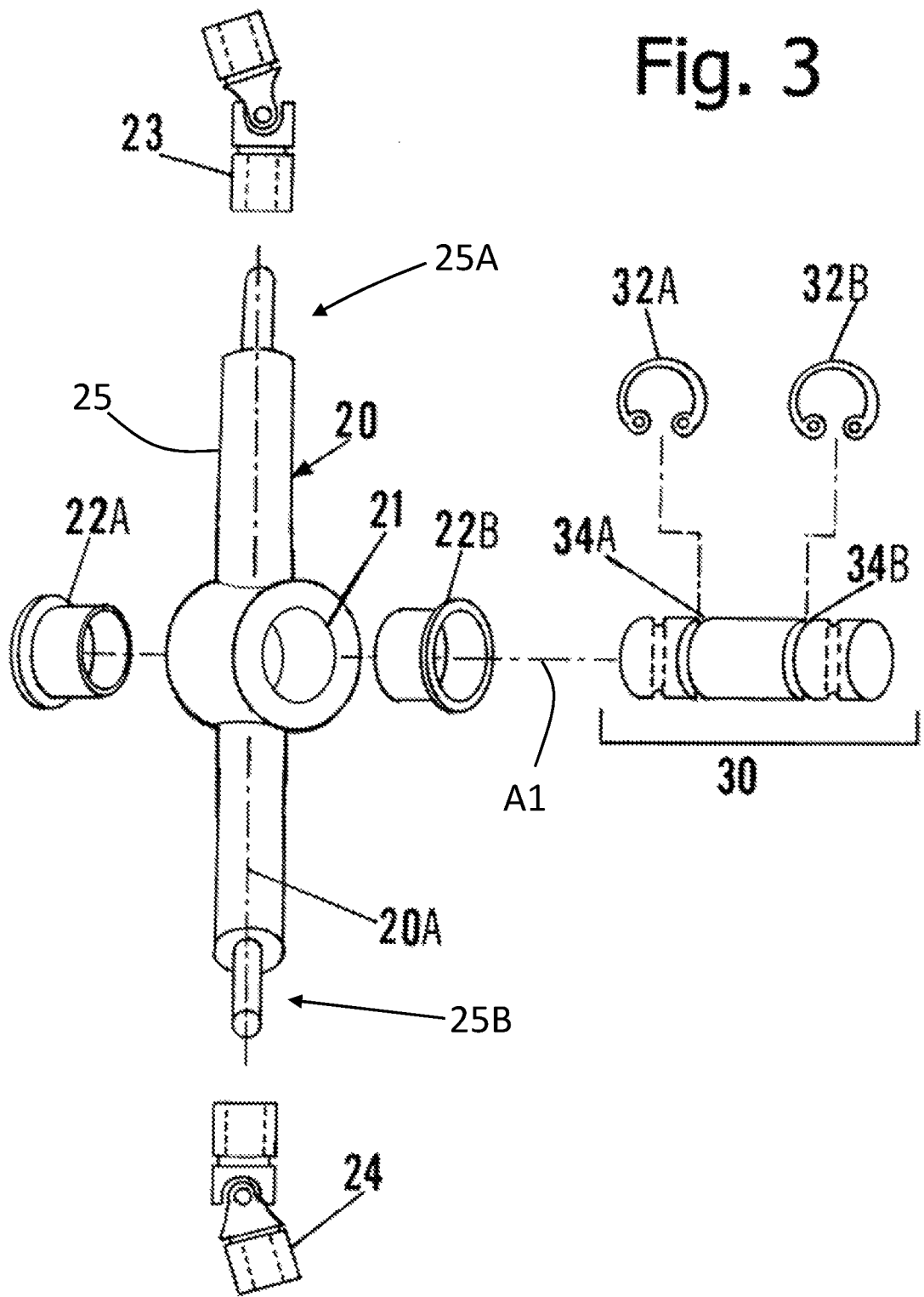
FIG. 3 is an exploded view of a spindle and axle as disclosed in accordance with at least one embodiment of the present invention.

With reference now to FIG. 3, a perspective view of axle 30 and spindle assembly 20 is shown. Specifically, the spindle assembly 20 of at least one embodiment includes a shaft 25 with a first or upper end 25A and an oppositely disposed second or lower end 25B. In addition, the shaft 25 of at least one embodiment includes a channel or hole 21 disposed through the width thereof.

The axle 30 is positioned through the hole 21 and freely rotatable therein, for example, about axis A1. In at least one embodiment, bushings 22A and 22B may at least partially fit into each opposite side of axle hole 21. Still referring to FIG. 3, the axle 30 of at least one embodiment may be secured through the spindle assembly 20 by c-clips 32A and 32B that fit into corresponding grooves 34A and 34B, respectively, located on the axle 30. This maintains the axle 30 within the hole 21, while the weighed assembly 40 (shown in FIG. 2, for example) rotates via rotation of the axle 30 within hole 21 and about axis A1. Other mechanisms or structures that maintain the axle 30 within hole 21, for instance, in addition to or instead of c-clips 32A, 32B or bushings 22A, 22B, are contemplated within the full spirit and scope of the present invention.

Furthermore, in the illustrated embodiment both ends of spindle assembly 20 or shaft 25 are rounded for cooperative insertion into corresponding couplings, such as a first or upper coupling 23, and a second or lower coupling 24.

Figure 4:
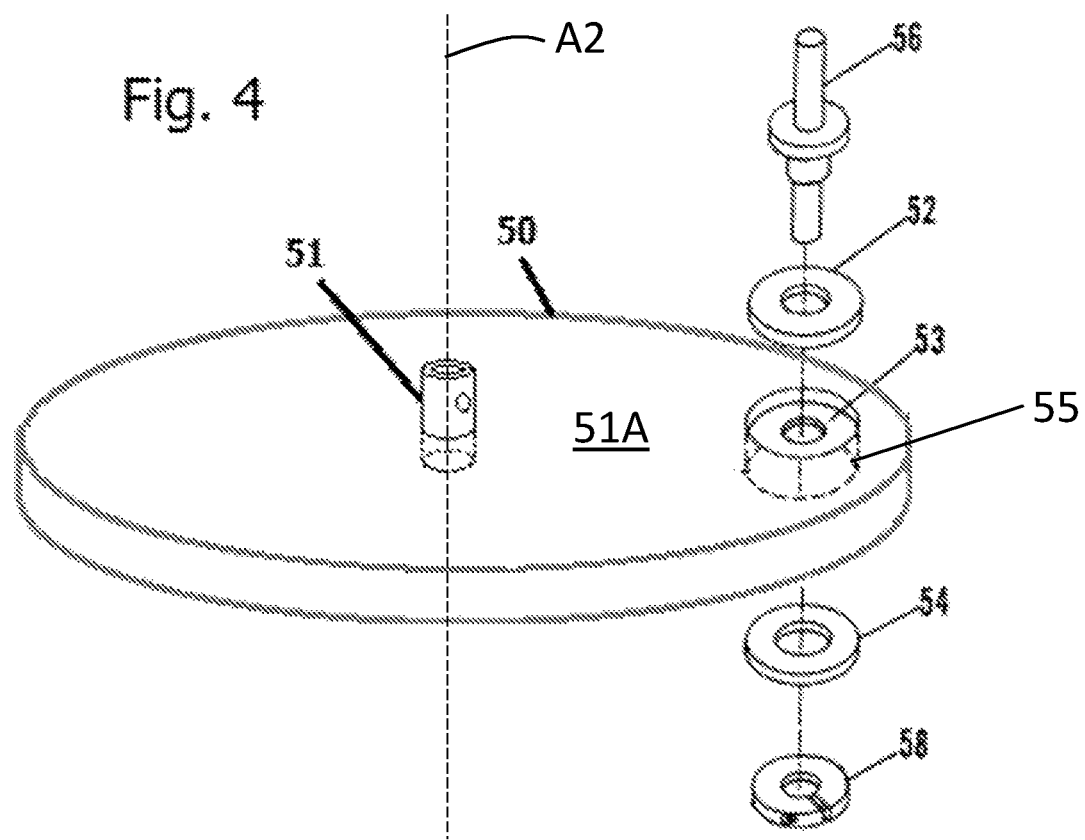
FIG. 4 is a perspective and partially exploded view of a turntable as disclosed in accordance with at least one embodiment of the present invention.
Figure 5:
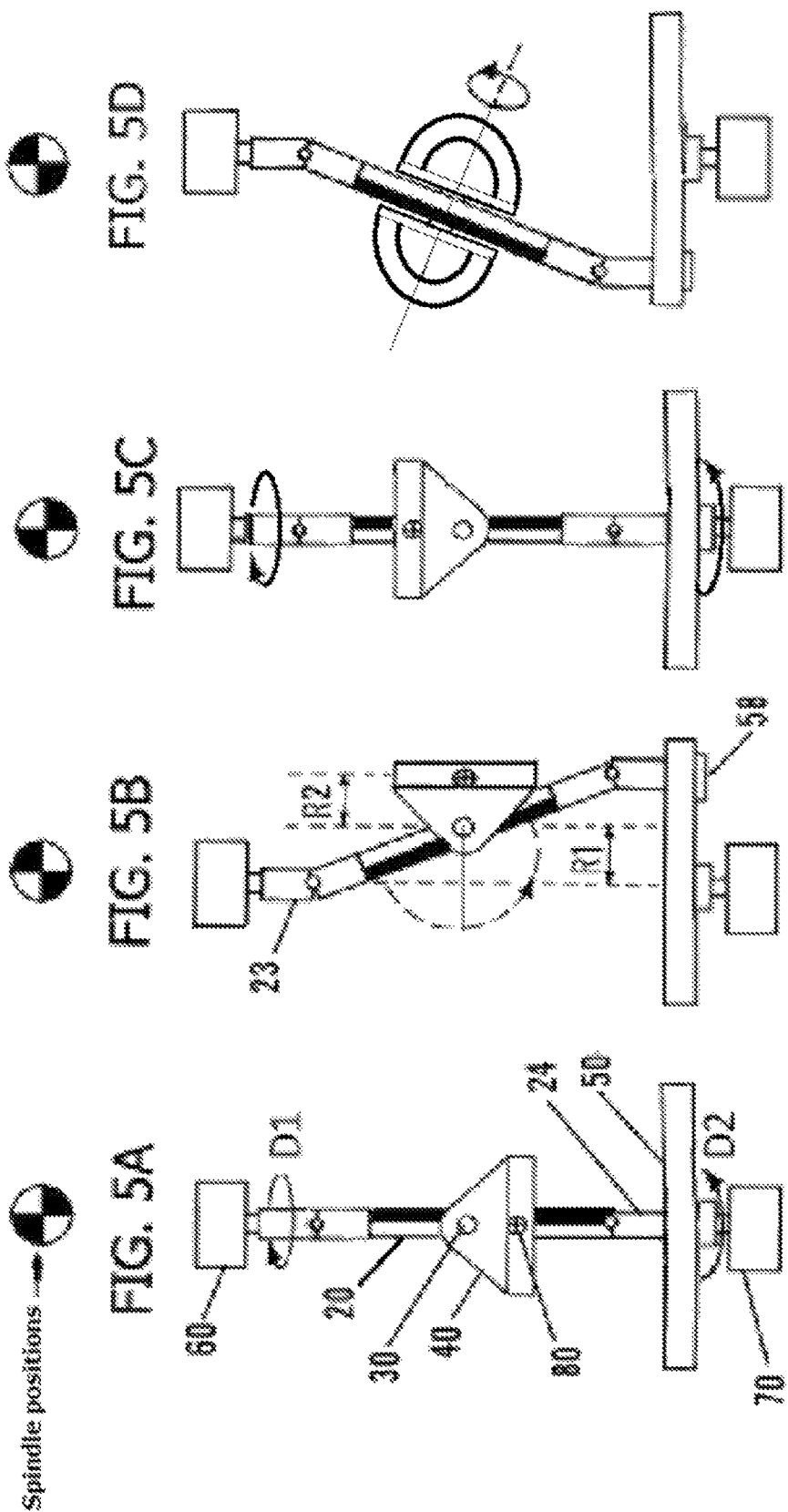
FIGS. 5A, 5B, 5C and 5D illustrate side views of a portion of the Impulse Driver of at least one embodiment of the present invention, showing the CM 80 trajectory.

Turning now to FIG. 4, an exploded view of a turntable 50 is shown. Turntable 50 is drivingly engaged or rotated via lower motor 70. For instance, lower motor 70 will rotate the turntable 50 via one or more belts, or other connections. As an example, turntable 50 of at least one embodiment may have a hole 51, for example, at the center thereof, for mounting onto the lower motor 70 or otherwise mounting to one or more pins or other devices that allow the motor 70 to rotate the turntable about axis A2.

Furthermore, in at least one embodiment the turntable 50 has a hole 55 near or proximate the outer peripheral edge. For instance, in the illustrated embodiment, the mounting or swivel pin 56 is disposed close to the outer peripheral edge of the turntable 50, although other locations are contemplated. Hole 55 may have a ledge or shelf 53 therein. The turntable 50 of at least one embodiment includes a mounting pin or swivel pin 56 extending from a top surface 51A of the turntable 50. The mounting or swivel pin 56 is disposed in an offset position relative to a center axis A2 of the turntable. The lower coupling 24, to which the shaft 25 is connected, will connect to the top of swivel pin 56 extending from the turntable 50.

For instance, at least one embodiment has a support bearing 52 that fits above shelf 53, and an alignment bearing 54 fits below shelf 53. Swivel pin 56 of one embodiment will pass through the shelf 53 of hole 55. Swivel pin 56 is freely rotated inside/through bearings 52 and 54 by upper motor 60. Clamp 58 fits onto the lower end of swivel pin 56 and prevents the pin from being pulled upward.

Further, upper motor 60 is structured to drivingly rotate the upper coupling 23 about central axis A2. One or more pulleys, belts pins or other connecters may be used to interconnect the upper motor 60 to upper coupling 23. Upper coupling 23 of at least one embodiment includes a joint or pivot mechanism, as illustrated in FIGS. 1 and 3, for example. This allows the shaft 25 to angle outward and connect to the lower coupling 24 located a distance out from axis A3. Rotation of upper coupling 23 will cause the interconnected shaft 25 of the spindle assembly to also rotate about axis A4.

As described herein, operation of at least one embodiment of the present invention may include rotation of the upper coupling 23 (and therefore the shaft 25) in a first direction, while simultaneously rotating the turntable 50 in a second direction about a center axis A2. In at least one embodiment, the first and second directions (e.g., the rotational directions of the upper coupling and the turntable) are opposite one another. Furthermore, the axes A2 and A3 may be aligned such that the upper coupling 23 will rotate about the same substantially vertical axis as the turntable 50. This is represented in FIG. 1 at reference character 90.

It should be noted that students or other users of the device and/or assembly described herein understand that a pivotal force is caused by angular momentum of the turntable 50 and the mechanical orientation between axle 30 and spindle assembly 20. The natural tendency for particles released from rotating about an axis is to follow a path tangential to a radius drawn from the axis of rotation. Therefore, the CM 80 of weight assembly 40 responds by pivoting about axle axis A1.

In addition, FIGS. 5A, 5B, 5C, 5D and FIG. 6 can be viewed and/or studied simultaneously to understand the various positions of the spindle assembly 20 and weighed assembly 40.

For instance, FIG. 5A shows weight assembly 40 on spindle assembly 20. In FIG. 5A, the spindle assembly 20 is rotating in a clockwise direction, as represented by directional arrow D1, while turntable 50 which is simultaneously rotating in a counter-clockwise direction, as represented by directional arrow D2. It should be noted that these directions D1, D2 are presented as exemplary, such that, opposite directions can be implemented. Still referring to FIG. 5A, weight assembly 40 is at a point nearest to the reader. Angular velocity of turntable 50 causes the weight assembly 40 to begin pivoting, for example, about axis A1 (as shown in FIG. 3).

In FIG. 5B, the spindle assembly 20 has rotated the weight assembly 40 so that the CM 80 is pivoted to a radial of R1+R2.

In FIG. 5C, the weight assembly 40 is fully inverted and the CM 80 is at a radial distance approximating R1. Spindle assembly 20 has rotated the weight assembly 40 to a position where tangential pivoting is not possible. Weight assembly 40 is at a point farthest from the reader.

In FIG. 5D, the weight assembly 40 is pivoting downward, still in a position where tangential pivoting is not possible because of a new spindle 20 position.

Figure 6:
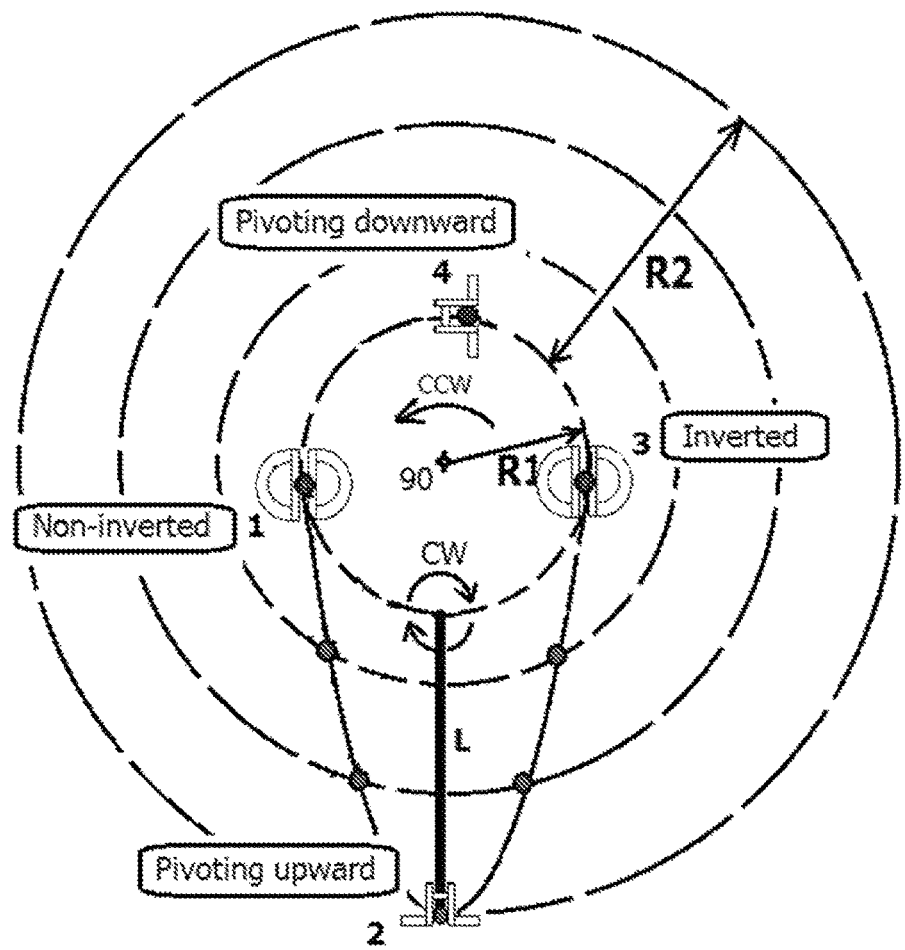
FIG. 6 is a schematic illustrating a top view of the CM 80 trajectory as the Impulse Driver operates in accordance with at least one embodiment of the present invention.

FIG. 6 is a schematic representation from a view above central axis 90. The rings in FIG. 6 represent angular momentum fields generated by rotation of the turntable 50. The radial line labelled "L" represents the distance between axle 30 and CM 80. The length of "L" is exaggerated for simplicity. Axle 30 orbits central axis 90 at a constant radial distance of R1. In the present example, CM 80 is shown as a large dot which follows an elliptical path which is determined by weight assembly 40 geometry, spindle 20 offset and the speeds of motors 60 and 70.

FIG. 6, position 1 (identified as "Non-Inverted") corresponds to FIG. 5A. The CM 80 of pendulous mass 40 is orientated on spindle assembly 20 so that pivoting of the weight assembly can begin.

Pivoting continues to position 2 (identified as "Pivoting Upward"), which corresponds to FIG. 5B.

As the spindle assembly 20 continues rotating, the CM 80 pivots upward to full inversion, at position 3 (identified as "Inverted"), which corresponds to FIG. 5C.

From position 3 to position 4, the weight assembly 40 continues pivoting downward, at a radial distance of approximately R1. Position 4 (identified as "Pivoting downward") corresponds to FIG. 5D.

Rotations and pivoting continue to position 1, and the cycle repeats.

Figure 7:
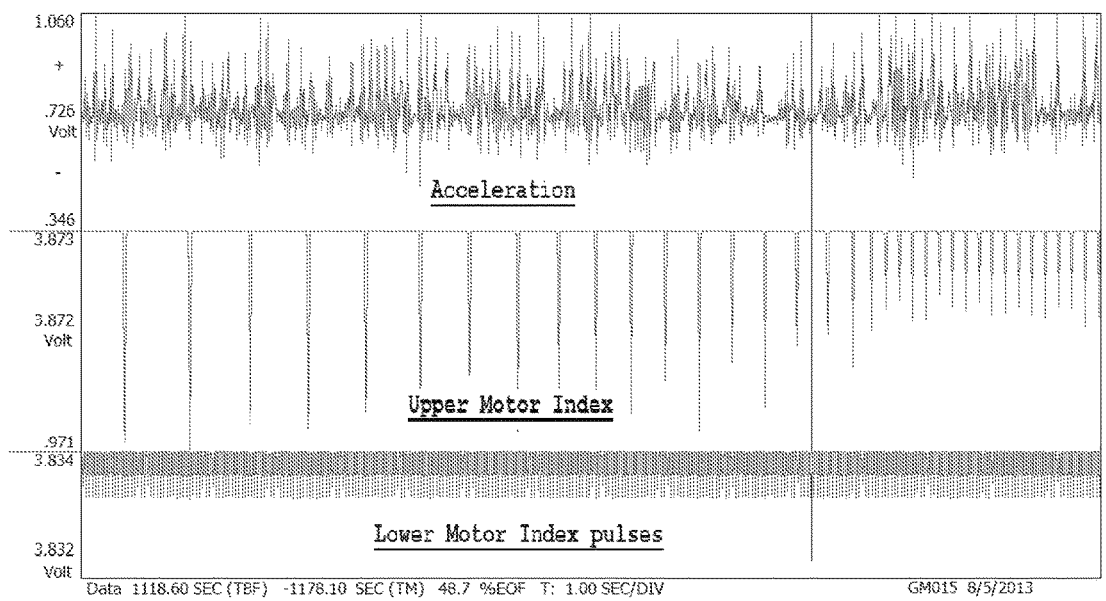
FIG. 7 is a plot of vertical acceleration, as well as upper and lower motor index pulses, as done by testing by the devices of at least one embodiment of the present invention, for example, as shown in FIGS. 9, 10 and 11.

FIG. 7 is a plot of the signal from Z-axis accelerometer 103 showing vertical impulses, and index pulses of stepper motors 60 and 70. The amplitude of the positive acceleration pulses above the baseline are greater than the negative acceleration pulses that are below.

Figure 8:
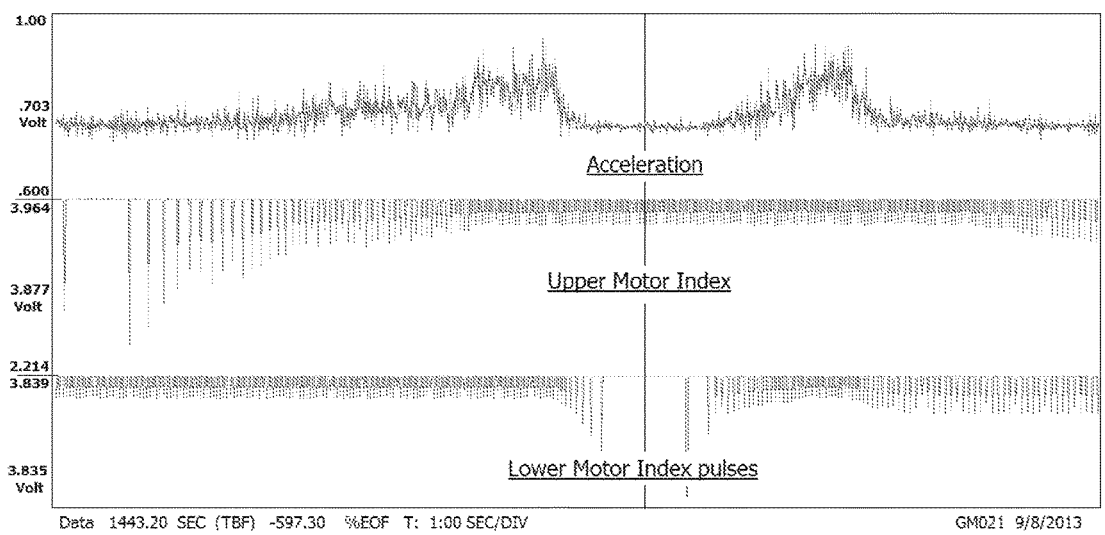
FIG. 8 is a plot showing acceleration bursts as done by testing the device in accordance with at least one embodiment of the present invention.

FIG. 8 shows vertical acceleration impulses in response to motor-ramping as described in the section titled (Optional) Pivot Encoder.

FIG. 9 is a partial perspective view that shows upper part of the Impulse Driver 10 of at least one embodiment, such as a portion of the upper platform 60A. In particular, FIG. 9 illustrates, among other items, upper rotation flag 100, index sensor circuit board 102, roller brackets 220, and vertical accelerometer 103. In at least one embodiment of the Impulse Driver the lower motor assembly is identical to the upper motor assembly except there is an accelerometer in the upper motor assembly.

Figure 10:
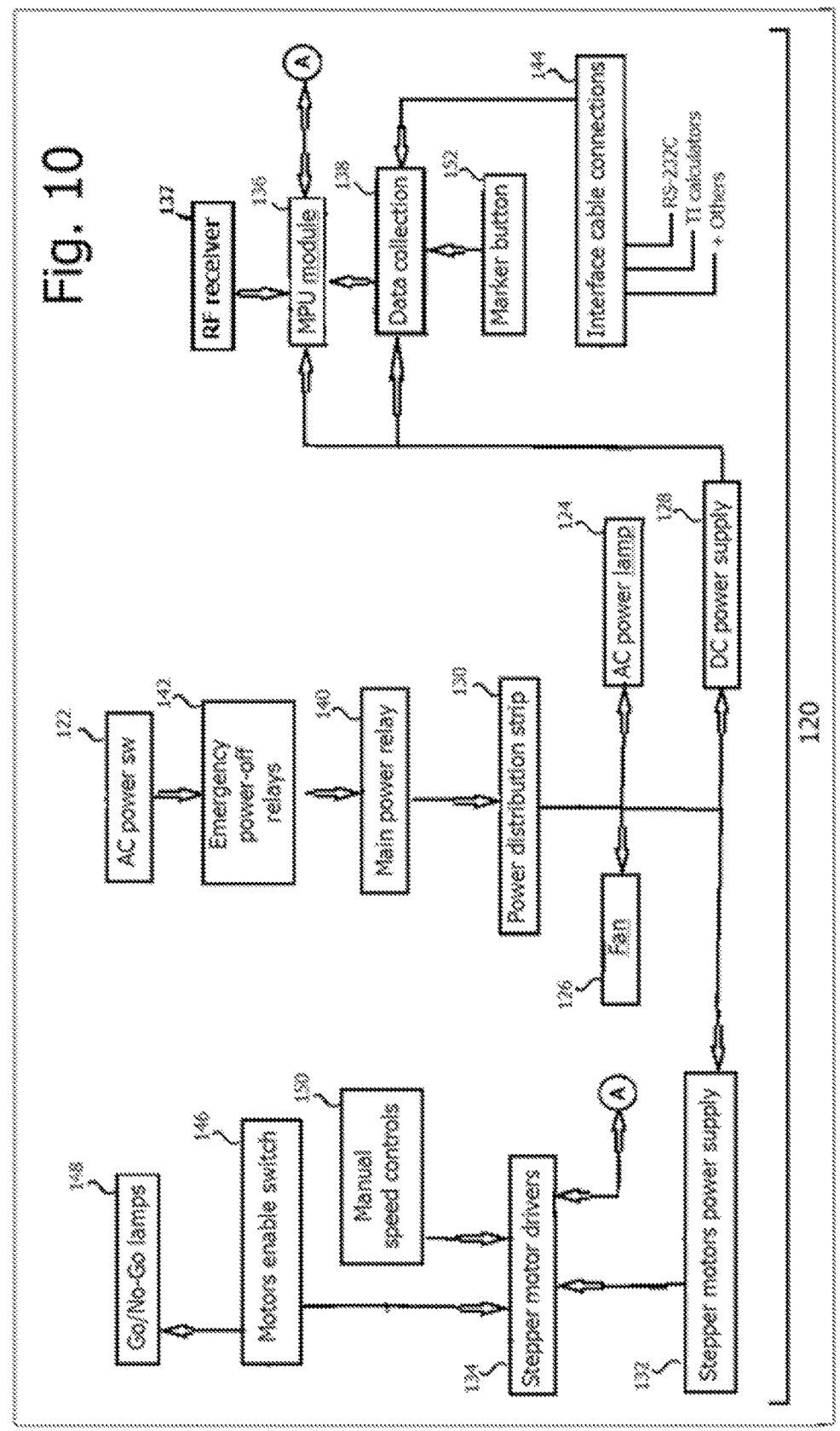
FIG. 10 is a block diagram showing controller 120 components for experimenting with the Impulse Driver of at least one embodiment of the present invention.

FIG. 10 is a block diagram showing controller 120 components for experimenting with the Impulse Driver 10 of at least one embodiment. For example, power is distributed from AC power strip 122 through emergency power-off relays 142A and 142B, main power relay 140, through power distribution strip 130, to motor drivers 134A and 134B which are controlled either by manual speed controls 150, embedded program control via MPU module 136 or by external computer (not shown), RF receiver 137. Power is also routed to data collection module 138, as well as motor enable switch 146, marker button 152, and both AC power lamp 124 and go/no-go lamps 148.

Interface cabling panel 144 receives signals from teststand 200 interface panel 230. An external computer RS232C connection is available and accommodation can be made for graphic calculator interfacing.

Figure 11:
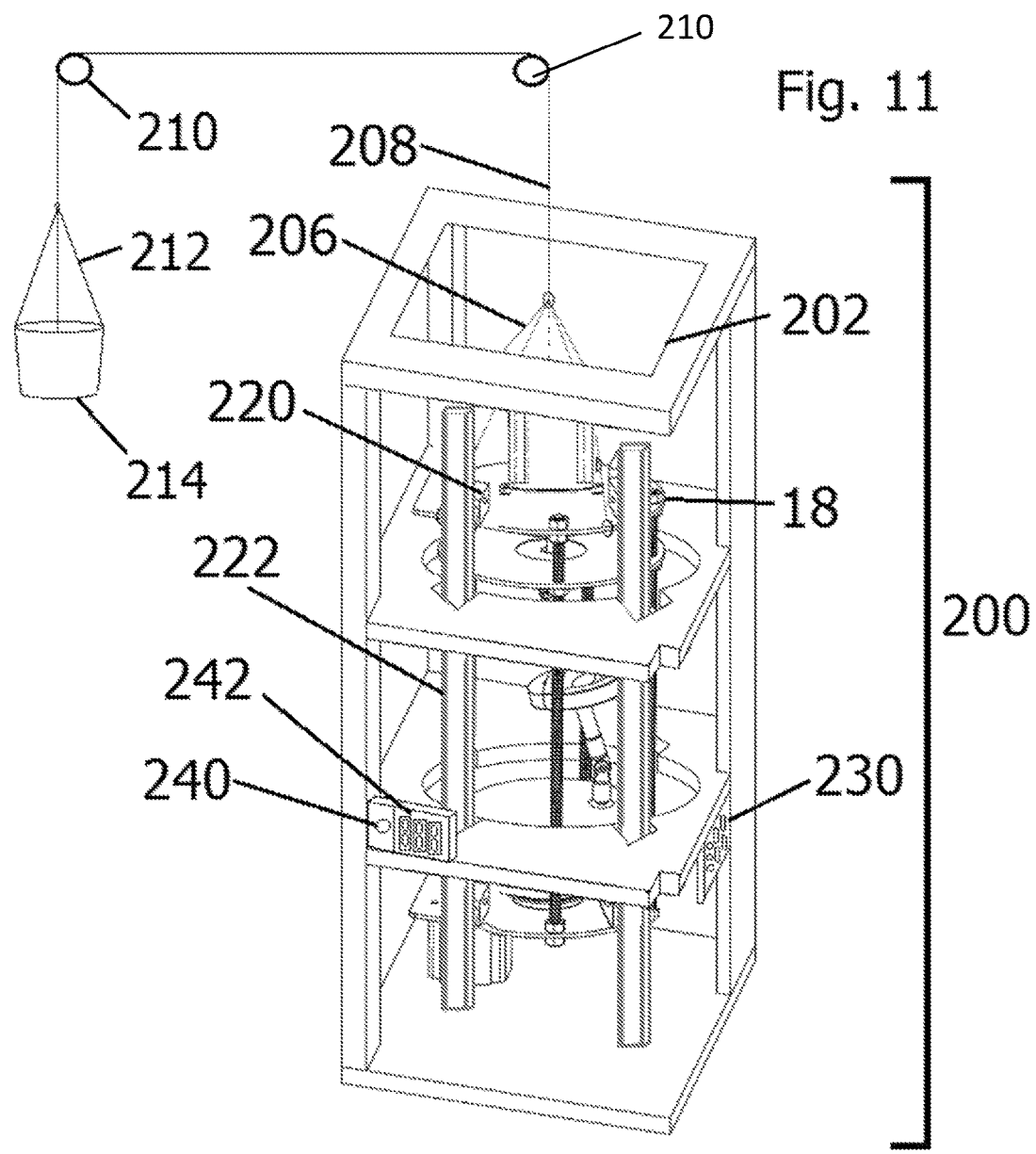
FIG. 11 is a perspective view of a teststand 200 used for testing and monitoring the Impulse Driver as disclosed in accordance with at least one embodiment of the present invention.

FIG. 11 is a plain view of a teststand 200 used for testing and monitoring the Impulse Driver 10. Chains or other supports 206 may be attached to the top of frame 18, for example, when the Impulse Driver 10 is lowered into the teststand 200.

In at least one embodiment of the present invention, the teststand 200 can be used to demonstrate linear acceleration by: $a=(m2-m1)/(m2+m1)$ g, where m1 is the mass of the Impulse Driver 10, m2 is the mass of a counterweight 108 and g is the gravitational acceleration. Additionally, as illustrated there is a wire or other support device 208 that passes over one or more pulleys, as represented as 210, which are used to avoid any contact between the Impulse Driver 10 and the counterweight 214.

In at least one embodiment of the present invention, pivoting motion of weight assembly 40 creates torque forces within impulse driver 10. Lateral forces are restrained by teststand members 222, such as angle irons, and, in some cases, a heavy weight (not shown) that can be placed on top of teststand 200. Downward force generated by weight assembly 40 tugs against counterweight 214, wire or support 208, pulleys 210 and the weight of impulse driver 10. When the upward force generated by weight assembly 40 reduces wire tension between impulse driver 10 and pulleys 210 the inertia of pulleys 210 can be overcome resulting in impulse driver 10 accelerating upward and counterweight 214 accelerating downward momentarily. Recordings of Z-axis acceleration are shown in FIGS. 7 and 12.

Figure 12:
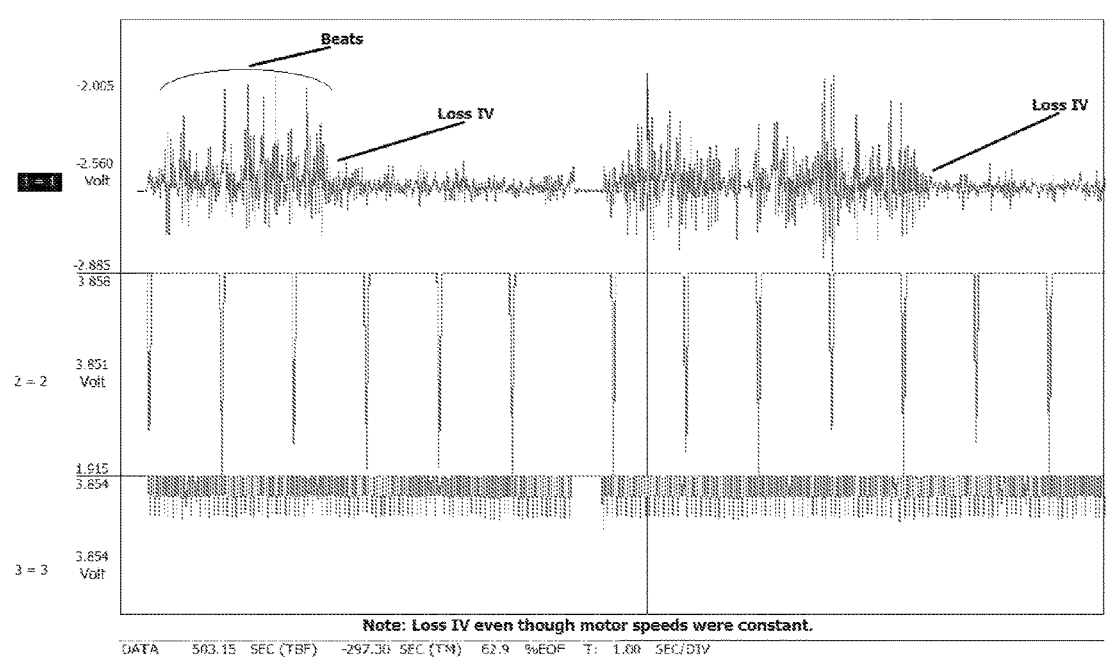
FIG. 12 is a plot showing parametric "beats" followed by loss of Resonance signals.

FIG. 12 is a plot that shows the effects of parametric resonance. Resonant "beats" are seen at the left of the plot. Their amplitude increases and suddenly diminishes to a low level. Synchronized video recordings show the weight assembly stopped pivoting 360 degrees at the same time that resonance was loss. The plot also shows both motor's speeds.

Figure 13:
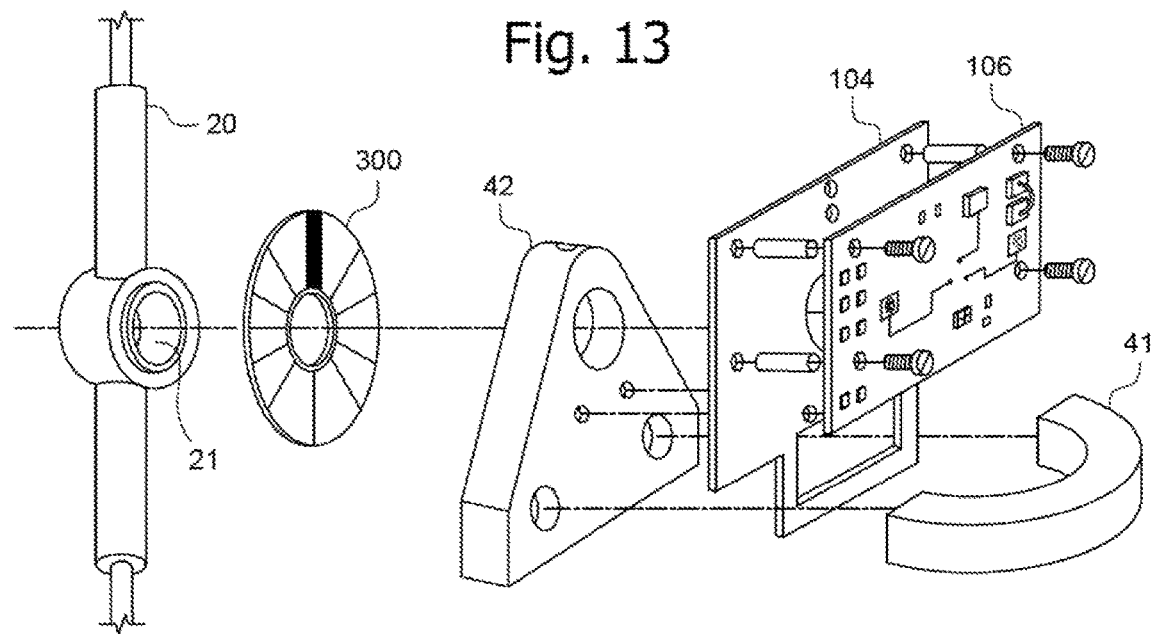
FIG. 13 shows the (optional) Pivot Encoder hardware.

FIG. 13 shows the hardware of the Pivot Encoder. Encoder wheel 300 is fixedly mounted onto spindle 20, rf circuit board 106 is piggy-back mounted onto sensing circuit board 104 which is attached to support part 42 by two screws (not shown). The Pivot Encoder detects radial markings on pivot wheel 300 and transmits signals to RF Receiver 137 in controller 120.

Figure 14:
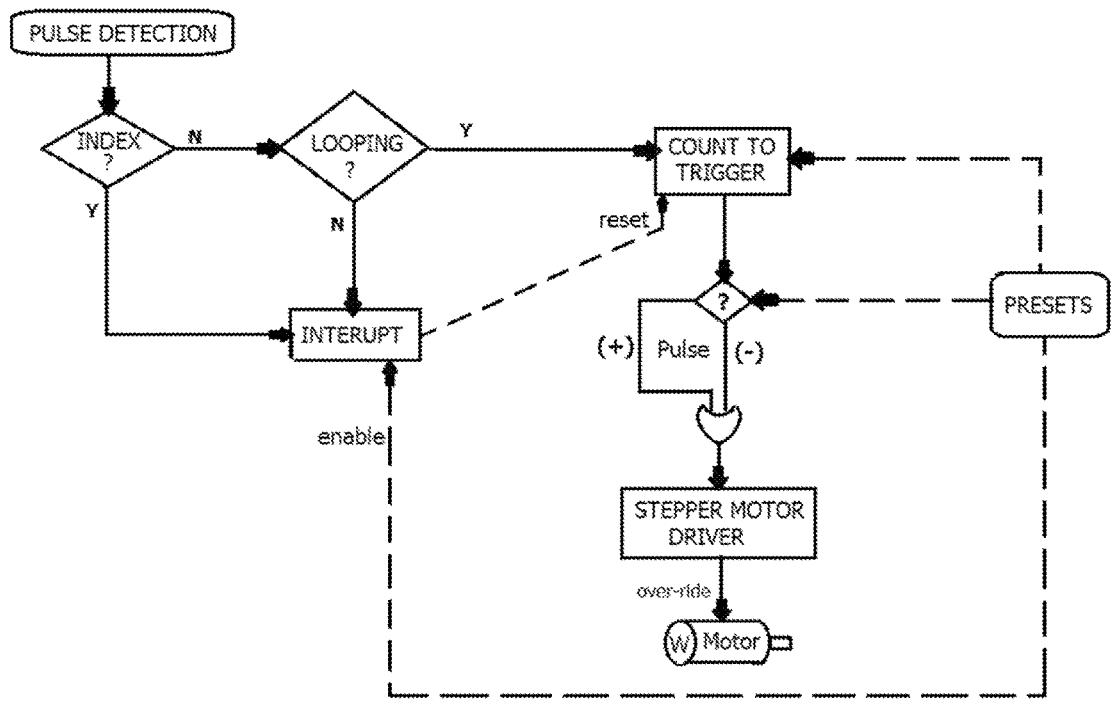
FIG. 14 is a logic flow diagram for the Pivot Encoder.

FIG. 14 shows the flow of information from detecting the index mark on the encoder wheel to counting the marks on the encoder wheel and matching the count to a preset value. Presets are set by the students, enabling the interrupt circuit, setting the counter value and setting motor pulse direction. This procedure can produce motor ramping as shown in FIG. 8.

Figure 15:
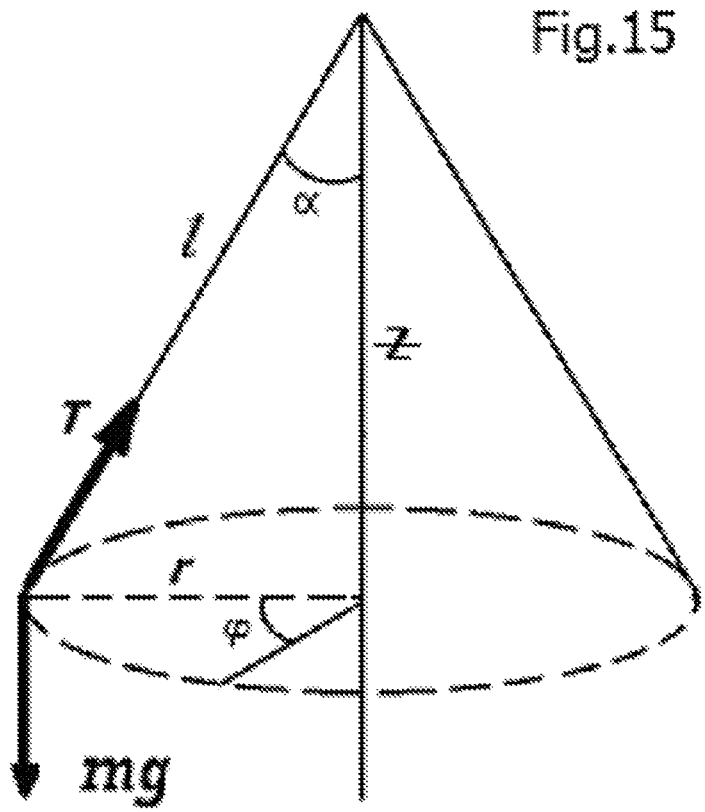
FIG. 15 is a drawing showing coordinates for Spherical Pendulum motion.

FIG. 15 shows the basic conic section that axle 30 of weight assembly 40 travels on as described in the section Mathematics of the Impulse Driver.

Figure 16:
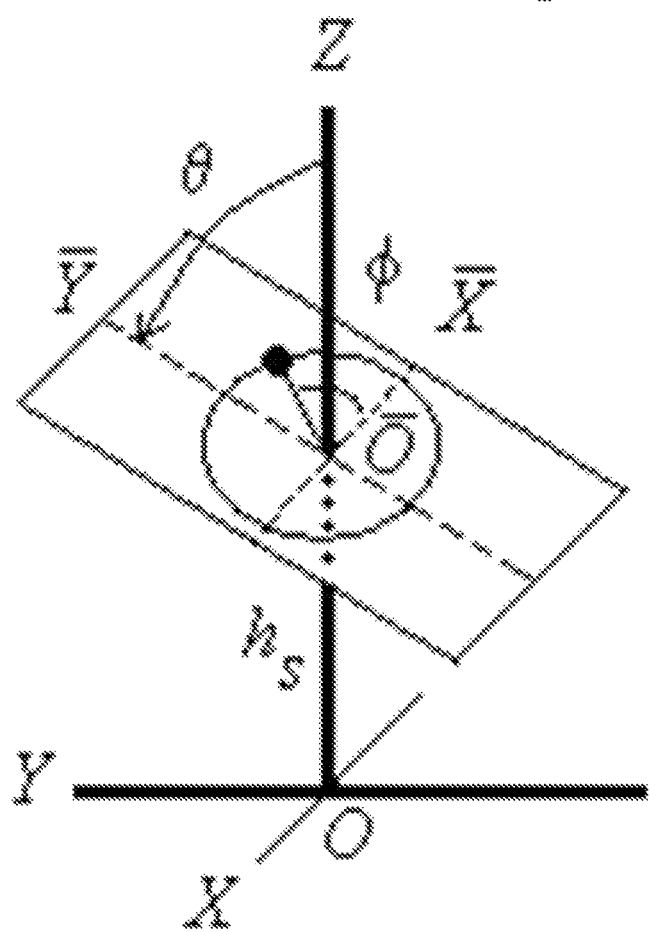
FIG. 16 is a drawing showing coordinates for center-of-mass (CM) travels.

FIG. 16 relates to the orbital travelling plane of the CM during pivoting as described in the section Mathematics of the Impulse Driver.

Figure 17:
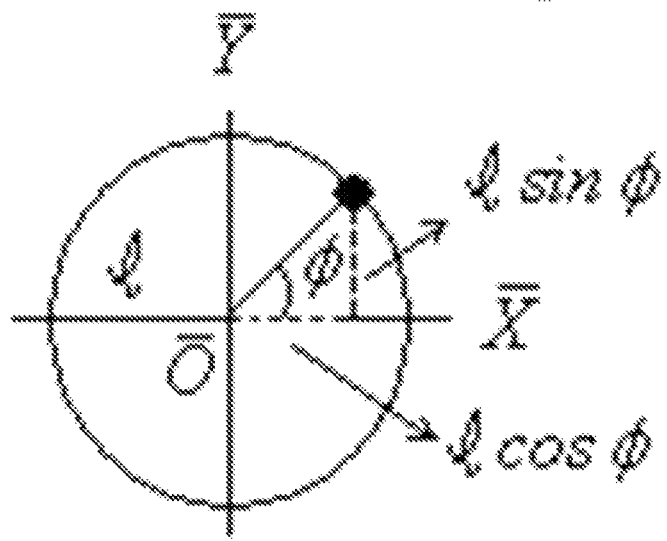
FIG. 17 is another drawing showing the coordinates of center-of-mass (CM) motions.

FIG. 17 relates to the orbital travelling plane of the CM during pivoting as described in the section Mathematics of the Impulse Driver.

Figure 18:
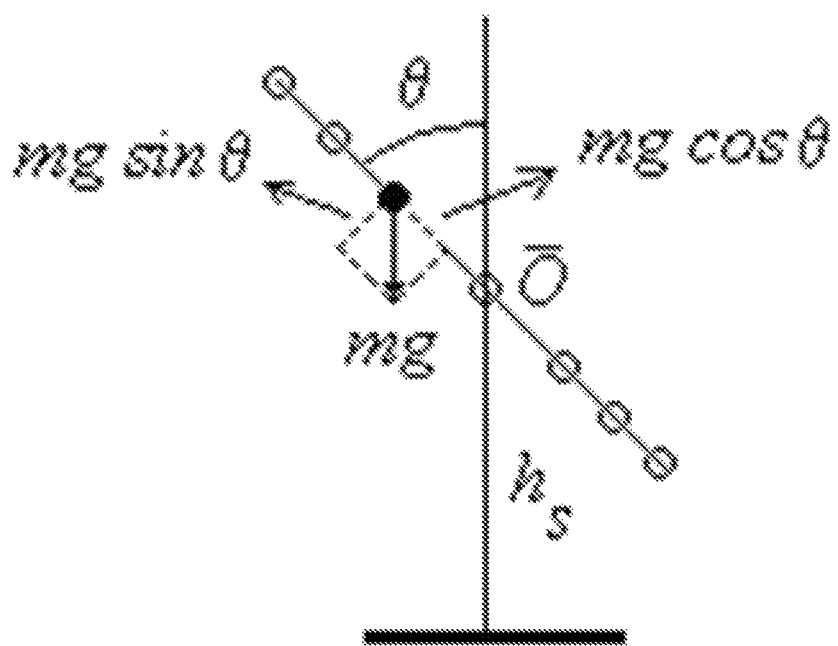
FIG. 18 is a further drawing of center-of-mass (CM) motions.

FIG. 18 relates to the orbital travelling plane of the CM during pivoting as described in the section Mathematics of the Impulse Driver.

Teststand

Referring again to FIGS. 1, 9 and 11, in at least one embodiment, the frame 18 includes a plurality of rollers 220 mounted thereon. For example, the rollers 220 may be mounted to the frame 18, such as at upper platform 60A, via roller frames 218. Rollers 220 may extend slightly beyond the outer peripheral edge of the upper platform 60A and align with teststand members 222. As shown in FIG. 9, there are four (4) sets of rollers 220 mounted concentrically about the upper platform 60A, and a corresponding number of teststand members 222. The teststand members 222 may include guides, which in the illustrated embodiment include angle irons, upon which the rollers 220 can roll. A duplicate set of rollers 220 are mounted to the lower platform 60B of at least one embodiment. The teststand members 222 may extend all the way down to the lower platform 60B such that the corresponding rollers on the lower platform 60B also align with the teststand members 222. In other embodiments, additional frame members may be used for the rollers at the lower platform 60B. In any event, the rollers 220 at the upper and lower platforms will roll along the guides or frame members (such as angle irons), which in some embodiments may be supported by additional horizontal supports.

It should be noted that in at least one embodiment, there is a small gap between the rollers 220 and the teststand members 222 or angle irons such that in a resting position, at least one of the rollers 220 may not be touching the corresponding frame member 222. For example, in one embodiment, the gap between the teststand members 222 and the rollers 220 is approximately 1.57 mm, although other distances may be used in accordance with the full spirit and scope of the present invention.

Accordingly, in at least one embodiment, the frame 18 is suspended on chains or supports 206 through hole or opening 202 and connected to wire or support 208, which passes over rollers 210, and is connected to chains or supports 212 and counterweight 214. In an exemplary embodiment, the counterweight 214 may be a bag or bucket that can be filled with sand, etc. The counterweight 214 in some implementations, experiments or embodiments may weigh approximately the same as the frame 18.

For instance, the weight of the counterweight 214 may be adjusted or defined by suspending the frame 18 inside the teststand 200, and running both motors 60 and 70 to ensure frame 18 does NOT rise due to non-Resonant forces.

In some embodiments, the teststand 200 has interface panel 230 for connecting cables from controller 120, and for boosting sensor signals from rotation sensors 102 and accelerometer 103. A digital timer 242 and marker lamp 240 may be mounted in the field of view of an (optional) video camera, which can be used to synchronize video records with data records.

Controller 120 has Interface cabling panel 144 which receives signals from teststand 200 sensors 101, 102, and 103 as well as a computer interface, such as RS-232C serial interface, USB, or other connection. Optional accommodations can be made for graphic calculator interfacing.

Auxiliary equipment may include a video camera and oscilloscope for simultaneous data collection. All data streams can be synchronized by use of Marker Button 152, on controller 120, which flashes marker lamp 240 and simultaneously sends a signal to data recording software and an (optional) oscilloscope via connections on interface panel 230.

Manual Operation

In at least one embodiment, the upper motor 60 and lower motor 70 may be stepper motors for maintaining resonance while accurately positioning the weight assembly 40 for pivoting.

Selection of motors 60 and 70 as well as motor drivers 134 are chosen based on torque requirements for accelerating and decelerating the inertial load of the moving parts of Impulse Driver 10. Some motor manufacturers offer selection examples, charts and formulas. Users must provide intended speeds ranges as well as inertial loading information such as mass, moment of inertia, radius of gyration, and gear reduction considerations (when appropriate). Some mechanical parts, such as universal couplings 23 and 24, have operating limits which must be taken into consideration when determining maximum operating speeds. In many cases, the speed of the upper motor speed is maintained below the inhibiting effects of precession forces. Calculation of precession forces is described in the section Mathematics of the Impulse Driver.

The following describes some of the software parameters used during testing of Impulse Driver 10. Stepper Control Language (SCL™) is software provided by the manufacturer for controlling stepper motors 60 and 70. The present embodiment is not intended to be the only materials and methods for applying the invention. However, this embodiment has been successfully tested and represents the principle of Impulse Driver 10.

It is worth noting that upper motor 60 is used only for positioning weight assembly 40.

In the present embodiment Manual Mode is initiated by selecting the appropriate mode for motors 60 and 70 based on the manufacturer's configuration software. Manual Mode or operation may be used when the user has not predetermined Impulse Driver 10 motor speeds. Testing can begin after all steps in the checklists have been completed and software parameters set accordingly. All monitoring equipment should be active and set to the expected ranges of data signals.

CAUTION: Motors enable Switch 146, on controller 120, should be set so that Go/No-Go lamps 148 indicate motors are disabled. Table 8.1 is an example of operational settings for motor driver 134.

TABLE 8.1

| Action | Item | Value | Units |
|---|---|---|---|
| 1 select | velocity (Oscillator) mode | — | — |
| 2 select | speed proportional to analog input | — | — |

TABLE 8.1-continued

| Action | Item | Value | Units |
|---|---|---|---|
| 3 select | range | 0-5 | vdc |
| 4 select | speed proportional to analog input | 10 | rps |
| 5 select | function for enable input | switch 146 | — |
| 6 select | motor type | stp-mtr-23079 | — |
| 7 select | running current | 2.8 | Amps |
| 8 select | idle current | 50 | % |
| 9 select | idle current delay | 0.4 | sec |
| 10 select | waveform smoothing | off | — |
| 11 select | download to driver | — | — |

Switch 146 can enable and disable motors 60 and 70. Manual speed controls 150 can be used to vary the speeds of motors 60 and 70.

As the speed of lower motor 70 is increased, with the upper motor 60 turned off, users will observe the turntable 50 rotating, the spindle 20 revolving, and the weight assembly 40 swinging back and forth, e.g., like a church bell. The weight assembly 40 will not be rotating. If the lower motor 70 speed is increased enough, full 360 degrees, pivoting of weight assembly 40 will occur.

Under some starting conditions, with lower motor 70 only, the weight assembly 40 will go into an oscillation that the inventor calls "False Resonance"—pivoting inward every 180 degrees of lower motor 70 rotation. In such cases, switch 146 can be used to reset from False Resonance.

If the speed of the upper motor 60 is increased, with the lower motor 70 off, users will only see the weight assembly 40 spin about spindle 20.

The preferred method of Manual Mode or Operation is to spin-up or operate both motors 60 and 70 in a complimentary manner, always keeping the upper motor 60 at a speed much lower than the speed of the lower motor 70. The upper motor 60 should not reach speeds where precession inhibits pivoting of the weight assembly 40. Calculation of precession speed is defined in the section Mathematics of the Impulse Driver.

When a Resonant speed is reached, the swinging back and forth of weight assembly 40 changes, lateral vibrations diminish and noticeable vertical pulsing occurs. There are several Resonant ranges—ratios of motor speeds where vertical pulsing is the dominate force.

With practice and experience, students or other users will be able to finesse motor speeds to Resonant speeds where the weight assembly 40 periodically reduces wire 208 tension enough for the balance between counterweight 214 and impulse driver 40 changes, overcoming pulley resistance. Impulse Driver 10 rises upward, and counterweight 214 moves downward to a new balancing point.

Automatic Operation Automatic operation is used when the student or user has predetermined the speed ranges for motors 60 and 70. Automatic operation is initiated by selecting "SCL™ Mode" (or other corresponding mode) from the manufacturer's configuration software. Motors 60 and 70 can be controlled by MPU module136, external computer (not shown), or by commands downloaded into buffers of motor drivers 134.

Table 8.2 is a segment of a "Jogging" program. Parameters are set; stepping starts and continues for 15 seconds, speed increased for two seconds, speed reduced for five seconds followed by a stop command. Similar commands produced the spikes shown in FIG. 8.

TABLE 8.2

| | Command | Description | |
|---|---|---|---|
| 1 | PS | Pause | |
| 2 | JA 25 | Set acceleration rate | rps/s^2 |
| 3 | JL 25 | Set deceleration rate | rps/s^2 |
| 4 | JS 5 | Set speed | rps |
| 5 | CJ | Do Jog | |
| 6 | WT 15 | Wait | sec |
| 7 | CS 8 | Change speed | rps |
| 8 | WT 2 | Wait | sec |
| 9 | CS 5 | Change speed | rps |
| 10 | WT 5 | Wait | sec |
| 11 | SJ | Stop jog | |
| 12 | CT | Execute | |

The present embodiment has MPU module 136 which uses C+ programming language. Motor drivers 134 can accept SCL™ commands, directly from a computer running VisualBasic, C+, LabView, or other programs that can output SCL™ commands in ASCII format. Students are not required to learn a new, complex, programming language.

Motor Drivers 134 are capable of pulsing stepper motors 60 and 70 windings directly using "Pulse & Direction Mode" from the manufacturer's configuration software. This mode is essentially binary and requires a working knowledge of stepper motor phasing and programming at assembly level—it is not recommended for inexperienced users.

Referring to Table 8.2, once the "CT" command is executed motors 60 and 70 begin stepping in the prescribed direction and rate. The action will continue until an "SJ" command is encountered or the user toggles motor enable switch 146.

Events occur so rapidly during testing that observing and monitoring the actions of an Impulse Driver are best done by video and oscilloscope recordings. Video allows the user to see what is happening and record instances of interest. Video records can be synchronized with the digital data records by using marker button 152. A persistence oscilloscope can be attached to interface panel 230 for recording fast and/or synchronously occurring events for later analysis (i.e. pulses from rotation sensors as well as vertical motion from Z-axis accelerometer 103). A simultaneous audio recording, made during testing, can be very helpful for data analysis.

Step by Step Operations

SHORT CHECKLIST. The following short checklist has been used by experienced personnel who were not intending to perform a fully instrumented and documented test.

Main camera positioned; Background camera positioned; Oscilloscope ready; Power to preamps; Timer set to zero and placed in camera's field of view; Clocks synchronized; Disable Wi-Fi; Setup audio; Chassis main power ON; Speed pots set to zero; Load motor parameters; Test motors; Test EMO switch; Prepare data recording software; Position Impulse Driver+Free the counterweight; Start background camera+video recorder; Cue card Background camera; start main camera; Cue card main camera; Zoom and focus main camera; Start recording; Start timer and data recording software; Spin-up motors.

Impulse Driver Testing Checklist

Pre-calibrations are performed via the following steps. The first step is to weigh the Impulse Driver 10 and counterweight 214, and record the values. Check mechanical rigidity of all parts of Impulse Driver 10 and Teststand 200. Check pulley belt tension when applicable.

Manually rotate turntable 50 and spindle 20.

Check for correct AC power polarity at wall.

Prepare a cue card indicating test number, objectives, date and time. Auxiliary video equipment is used to record a brief test of equipment positions, movement of parts as well as introductory discussion by researchers/students.

Camera is positioned and focused with impulse driver, marker lamp 240 and timer 242 in field of view. Continue at Monitoring Procedures.

Post-calibrations involve securing all records immediately after testing ends. Determine data formats. Record an audio/video summary by one or more researchers/students. Store all data records to an external source, such as a DVD, and backup storage.

Data monitoring procedure depends on which monitoring protocol, equipment and software is chosen. Normally, data channels, limits, as well as directories and file titles are defined and initiated to full readiness.

At the conclusion of a test, the Monitoring Procedure describes the steps required to stop recording and secure the data. This step is followed by the Post-calibration procedures.

Real-time testing begins by following Impulse Driver Testing Checklist.

Heading information, such as test number, date, goals, and starting time is entered at the top of the form.

Pretest instructions include installing new batteries, synchronizing all clocks, lubing or oiling for minimum friction, removing possible distractions, and cleaning camera lens.

Mount impulse driver 10 into teststand 200, check vertical alignment and ease of movement between Impulse Driver 10 and rollers 210. Connect relaxed umbilical cables from interface panel 230. Check wiring connection between Teststand 200 and controller 120.

Auxiliary oscilloscope may be connected to interface panel 230. Clear-out scope memory, prepare for photo-1, set scope channels amplitude and timing, test signals to each channel.

Final equipment check involves: checking that manual speed pots are set to zero position or predetermined chosen speed settings; all computers powered on; controller 120 powered-up; motors switch 146 in "off" position; check monitoring software; verify timer 242 set to zero; power to video camera, check position and focus; check audio connections and set audio level.

DC power "on" to teststand 200; configure motor software and test motors 60 and 70; check accelerometer 103 signal by tapping on frame 18.

Start 'Active Recording' via camera light on; re-check video focus; start audio and video recording; show Cue Card; start timer 242; momentarily show real-time clock; start Monitoring recording; send Marker pulse (via 152 button) to data-stream and video via switch 152.

Dynamic testing begins by spinning up motors 60 and 70 to resonant speeds; visually verify resonance of weight assembly 40 is achieved; press marker button 152; save oscilloscope image of motor speeds. Change motor speeds to alternative resonant speeds as desired and repeat steps described here.

Terminate testing by: stopping motors; showing real-time clock in video; marker pulse 152; stop timer 242; stop video; stop monitoring software; power-off controller 120; return Impulse Driver lowest position. Secure all files. Verify all power is off.

(Optional) Pivot Encoder

Experimental evidence shows that the weight assembly 40 can oscillate into chaotic modes. Loss of resonance (IV) can occur when the system is excited by periodic variations of some parameter of the system.

When the process of oscillations caused by periodic modulation of some parameter acquires an increasing character, the phenomenon is call parametric resonance[1]. Parametric resonance occurs when different relationships between the frequency of modulation of a parameter and the natural frequency of the system are fulfilled.

[1] Butikov, Eugene I. (2015), *Simulations of Oscillatory Systems*. Department of Physics, ISBN-13:978-1-4987-0768-8 Saint Petersburg State University, Saint Petersburg, Russia Normally, the modulation period of the weight assembly 40 remains constant at Resonance. However, oscillations can acquire the character of beats, as shown in FIG. 12. As conditions for parametric excitation are fulfilled the amplitude grows and resonance becomes violated. The state of equilibrium becomes unstable. The weight assembly 40 drifts out of phase and this causes a reduction of amplitude—Resonance can be loss (See FIG. 12).

The Pivot Encoder overcomes loss of parametric resonance by monitoring the position of weight assembly 40 about pivot axle 30 and transmitting that information to RF Receiver 137 in controller 120 (or an external computer) which processes the data to determine the corrective motor signals that promote parametric regeneration.

FIG. 13 shows Pivot Encoder hardware that includes a code wheel 300 fixedly mounted around spindle hole 21. A battery-powered sensing circuit 104 and RF transmitter 106 are mounted on one side of the weight assembly 40. As the weight assembly 40 pivots, sensing circuit 104 detects reflective markings on the code wheel and passes the signal to RF transmitter 106, which sends the information to RF receiver 137 in controller 120.

The Flow Chart in FIG. 14 shows the software path for processing Pivot Encoder signals and generating corrective motor driving pulses. Student/Operators can preset parameters that enable/disable the interrupt routine, predefine the value of the trigger-counter, and preset motor commands for specific testing conditions.

If the software determines the signal received by the RF receiver is an index pulse (and the interrupt is set) the trigger-counter is reset to zero. If the received signal is not an index pulse, the trigger-counter is incremented. When the trigger-count gets to a preset value, a signal is sent to the motors to either pause or ramp-up (for a preset amount of time).

When the Pivot Encoder signal is out of phase from preceding Resonance cycles, for a given time period, one or both motors can be paused or accelerated in the corrective direction until Resonance is restored. FIG. 8 shows the acceleration effects of motor-ramping.

Tugging near the low point of weight assembly 40 orbit gives the optimal way to yield maximized restored energy in each turn, because the tensile force reaches a local maximum near the low point. This is an approach for restoring kinetic energy using parametric excitation which is a principle to increase energy. Giving a tangential acceleration in phase with gravity using another type of parametric excitation yields a larger tensile force near the low point and this maximizes this energy pumping effect. (See reference[2])

[2] Ohtaa, Ken (2010), *Analysis of Hammer Movement Based on a Parametrically Excited Pendulum Model* Japan Institute of Sports Science, 3-15-1 Nishigaoka, Kita, Tokyo 115-0056, Japan Similar methods have successfully demonstrated Time-Proportioning Control[3] is promising because it greatly simplifies the actuator, which can be a simple on-off motor signal.[i]

[3] Sarrett, John, and Tagg, Randall (1994). *Control of a Chaotic Parametrically Driven Pendulum*. Department of Physics, Metropolitant State College of Denver, Denver Colo. 80217, Department of Physics, University of Colorado at Denver, Denver, Colo. 80217

Genetic algorithms have been produced that can perform closed-loop feedback control for maintaining Resonance of chaotic oscillating systems[4]. The software is open-source and written in "C" language which, in one embodiment of the present invention, is the computer language of Arduino™ MPU 136 used by the Impulse Driver.

[4] Weeks, Eric R. and Burgess, John M. (1997). *Evolving artificial neural networks to control chaotic systems*. Center for Nonlinear Dynamics and Department of Physics, University of Texas at Austin. "C" programming language implementation available on the World Wide Web: [S1063-651X (97)05308-7

Mathematics of the Impulse Driver

The following mathematics is presented for students to learn about the Impulse Driver. Once calibrations are completed, and checklists steps have reached the appropriate point, students can begin dynamic testing.

Lower motor 70 is started either by manual controls 150 or from programmed instructions from MPU 136 (or optional remote computer). At constant velocity, axle 30 follows a circular path in a horizontal plane whose motion can best be described by equations for a Spherical Pendulum[5] (See FIG. 15). To understand what circumstances such a motion is possible and what the frequency is, we use the most convenient coordinates, which are the vertical one, z and the normal and tangential ones in the horizontal plane of motion.

[5] Hartog, J. P. Den (1961). Mechanics. USA:McGraw-Hill. ISBN 0-486-60754-2. Chapter 10, Example b, page 186.

The displacement z is constant in time, hence $\ddot{z}$ is zero, and the corresponding Newton equation is: mg−T cos α=m$\ddot{z}$=0 or $$T = \frac{mg}{\cos\alpha} = \text{constant.}$$

Then the resultant of the forces T and mg is a force T sin α=mg tan α in the horizontal plane, directed inward. In particular, the tangential component of force is zero and hence the tangential acceleration r$\ddot{\varphi}$ is zero, or $\dot{\varphi}$ is constant, as assumed.

The radial Newton equation is: mg tan α=m $\dot{\varphi}^2$ r
As in the simple pendulum, the mass cancels out, for the motion is independent of the mass of the particle. Solving for the angular speed, we obtain:

$$\dot{\varphi} = \sqrt{\frac{g\tan\alpha}{r}} = \sqrt{\frac{g}{l\cos\alpha}}.$$

The angle φ equals $\dot{\varphi}$t, and one full revolution occurs when φ increases by 360 degrees or 2π radians, or $$T\sqrt{\frac{g}{l\cos\alpha}} = 2\pi$$

And $$f = \frac{1}{T} = \frac{1}{2\pi}\sqrt{\frac{g}{l\cos\alpha}}$$

The frequency depends on the apex angle of the cone described by the pendulum. For a small angle α the frequency is the same as that of the "simple" pendulum.

By increasing the speed of lower motor 70, tangential acceleration gets converted to angular acceleration according to Newton's second law[6] and weight assembly 40 pivots higher. The calculation is made by multiplying angular acceleration by the radius to get the linear equivalent, which is the magnitude of the tangential acceleration $a=r\alpha$.

[6] Holzner, Steven, PhD, (2011). Physics for Dummies, Second Edition, New Jersey, Wiley Publishing. ISBM: 978-470-90324-7. Chapter 12, page 234.

Then, substitute $r\alpha$ for $\alpha$ in the equation for the angular equivalent of Newton's 2nd law, $$\tau=mr(ra): \tau=mr(r\alpha)=mr^2\alpha$$

In order for weight assembly 40 to pivot a full 180 degrees, the speed has to be such that the centripetal force equals the force of gravity. By simplifying the relevant equations, the mass drops out and we are left with: $v=\sqrt{rg}$ Where r=distance from axle 30 to CM 80 After weight assembly 40 passes 180 degrees of pivot, it accelerates downward due to gravity. If the downward velocity equals or exceeds $$\sqrt[v]{5},^7$$

[7] then there's enough energy for weight assembly 40 to do another full 360 pivot.

[7] Holzner, Steven, PhD, (2011). Physics for Dummies, Second Edition, New Jersey, Wiley Publishing. ISBM: 978-470-90324-7. Chapter 7, page 136.

Students can use the principle of conservation of mechanical energy to determine when weight assembly 40 will have enough energy to pivot a full 180 degrees.

Since:

$$mgh_1 + \frac{1}{2}mv_1^2 = mgh_2 + \frac{1}{2}mv_2^2$$

Where h=distance from axle to CM 80.
We can relate $h_2$ to $v_1$ in this way:

$$\frac{1}{2}v_1^2 = gh_2 \text{ and } h_2 = \frac{v_1^2}{2g}$$

Experiments with Impulse Driver 10 demonstrated weight assembly 40 is capable of chaotic oscillations where phasing between the driving force of lower motor 70 and weight assembly 40 could be loss; sometimes due to starting conditions, friction, and motor speed.

The purpose of stepper motor 60 is to orientate weight assembly 40 for pivoting at the correct time and thereby ensure resonance speeds are maintained.

Upper motor speed is kept below the threshold where gyroscopic forces can inhibit pivoting.[8] Gravity induced precession velocity is calculated by:

[8] Meriam, J. L. and Kraige, L. G. (2010). Engineering Mechanics: Dynamics, Sixth Edition, New Jersey: John Wiley & Sons Publisher. ISBN-13: 978-0470499788. Chapter 7, pages 575-578.

$$\Omega = \frac{g\bar{r}}{k^2 p}$$

Where: p=angular velocity
k=radius of gyration
g=gravity
r=torque arm
And precessional (resistant) torque force is given by:
T=Mgr M=Mass of weight assembly Impulse driver 10 is a system that can undergo parametric forcing by modulating stepper motor 60 periodically with time. FIG. 6 shows a top view of trajectory of CM 80. One can see the radial distance (R1) between the orbit of axle 30 and CM 80 periodically changes. Also, we see that CM 80 travels a greater distance in its parabolic arc than axle 30 and it does so in the same amount of time—thereby changing the moment of inertia about central axis 90.

A common familiar example of parametric excitation of oscillations is given by the playground swing which children play on. The swing can be treated as a physical pendulum whose reduced length changes periodically as the child squats at the extreme points, and straightens out when the swing passes through the equilibrium position. Periodic variations of the pendulum length with the frequency twice the frequency of natural oscillation cause the amplitude to increase progressively.

During early experiments with impulse driver 40 video records and accelerometer 103 recordings showed occasional loss of resonance even with constant driving force from both lower motors. See FIG. 12. However, given a short amount of time, the system recovers resonance on its own. It was discovered, this is a typical phenomenon of parametric excitation.

Butikov states[9]: "If conditions for parametric excitation are fulfilled at small oscillations and the amplitude is growing, the conditions of resonance become violated at large amplitudes, the drive slips out of resonance. The drive will then drift out of phase with the pendulum. The phase relationships between the modulation and oscillations of the pendulum change gradually to those favorable for the backward transfer of energy from the pendulum to the source of modulation. This causes gradual reduction of the amplitude. The natural period becomes shorter, and conditions for the growth of the amplitude restore."

[9] Butikov, Eugene I. (2015). Simulations of Oscillatory Systems. St. Petersburg State University: CRC Press Publishers. ISBN 13:978-4987-0768-8, page 216.

Support for Impulse Driver experiments is found using Butikov's Oscillating Systems simulation software. Parametric excitation can occur only if (even small) natural oscillations already exist. At slow spindle 20 speeds, there is a small wobble in the orbit of CM 80 due to rotation of weight assembly 40 on spindle 20 which is tilted as shown in FIG. 1. During rotation of weight assembly 40, CM 80 has to "climb up and over" spindle 20 when in pivoting orientation (See FIG. 5). Parametric resonance is possible when one of the following conditions for the frequency ω (or for the period T) of a parameter modulation is fulfilled:

$$\omega = \omega_n = \frac{2\omega_0}{n}, T = T_n = \frac{nT_0}{2}, n = 1, 2, \ldots$$

The speeds of stepper motor 60 and lower motor 70 are increased in a complementary fashion until weight assembly 40 reaches Resonance and starts pivoting three hundred and sixty degrees. With higher resonant speeds, vertical pulsing begins.

The pivotal force formula can be found by:

$$a = \frac{4\pi R_1}{T^2}$$

$$F_2 = \frac{mv^2}{R_1}$$

$$F_3 = F_1\left(\frac{mv^2}{R_3}\right)$$

where: $F_2$=centripetal force
$F_3$=pivotal force,
$R_3$=axle to CM distance (=l)

The mathematics describing the trajectory of CM 80 is analogous to that of an Olympian Hammer Throw before release.[10] Students must keep in mind that the sum of the forces on CM 80 must include the angular momentum of axle 30 at radial distance R1.

[10] Wagh, Sanjay M., Deshpande, Subodh S., *Hammer Throwing: Role of the Action of Athelete*, 2014, Central India Research Institute, 34, Farmland, Ramdaspeth, Nagpur 440010, India Coordinates illustrated in FIGS. 16, 17 and 18 show the Z-axis to be in the vertical direction through the axle center, the $\overline{X}$ axis is parallel to the baseplate, and the $\overline{Y}$-axis making an angle of θ with the Z-axis. The angle Ø is made by the location of the CM with the $\overline{X}$-axis. Coordinate axes ($\overline{X}$, $\overline{Y}$) are Cartesian with origin $\overline{O}$ at axle height $h_s$ above the baseplate. Z-axis and $\overline{X}$-axis are perpendicular to each other, the $\overline{X}$-axis and the $\overline{Y}$-axis are perpendicular to each other, but the $\overline{Y}$-axis and the Z-axis are not perpendicular to each other.

As the CM of the weight assembly moves along its trajectory, it follows from FIG. 16 that its vertical height is given as:

$h_o = l \cos\theta \sin Ø + h_s$

Here, l denotes the total length of R1+R2
$h_s$ is the height of the axle above the baseplate.
The X-coordinate of the CM is given as:

$x_0 = l \sin\theta \cos Ø + x_L$ where, $x_L$ denotes the X-coordinate of the axle and will be taken to be zero for the origin O of the (X, Y, Z) coordinate system.

Force of gravity on the CM acts downwards, and has an "unbalanced" component mg sin θ that acts to bring the CM downward. Therefore, the path of the CM is never circular as shown in FIG. 17, unless the system applies continuous vertical force during the pivoting of the Weight assembly. Nevertheless, during the "top" of the pivot, the motion of the CM can be approximated to be along the planar circle with the plane of the circle making an angle θ with the Z-axis as shown in FIG. 18.

The angular speed of the rotation of the Weight assembly is changing along the circular path of the CM. It is "largest" at the lowest height and "smallest" at the largest height of the CM. The tangential velocity $u_0$ varies along the trajectory of the CM with the angle ϕ.

The variation of the tangential velocity is given by:

$u_0 = l\omega_0(1 - \alpha \cos\theta \sin Ø) = \kappa - \alpha\omega_0 h$

When α<1
$\omega_0$ is the angular velocity of the CM when it is at the X-axis,
$\kappa = \omega_0(1 + \alpha h_s)$ is then a constant quantity.
κ=radius of gyration Note that α is a dimensionless constant and is a ratio of the "critical" angular velocity $\omega_c$, for which the tangential velocity $u_0$ is zero at the largest height for the given angle θ, and the angular velocity $\omega_0$ which the CM has when at the X-axis. For the CM to move further along the trajectory, it is required that $\omega_c < \omega_0$. In other words, it's required that α<1.

Pivotal angular velocity $\omega_0$ must also be "sufficiently large". The constant α<1 accounts for this as $u_0$ is never zero for any angle. Quantities $\omega_0$, l, $h_s$ and α are "constants".

UPWARD FORCE. Referring to FIGS. 5A, 5B, 5C, 5D; during Resonance, weight assembly 40 pivots to a point where axle 30 is perpendicularly aligned with central axis 90; weight assembly 40 inverts to a radial distance of R1+R2 and a vertical impulse is generated. Stepper motor 60 then positions spindle 20 so that weight assembly 40 continues downward, at a radial distance of R1, with axle 30 radially aligned with central axis 90.

Pulley Tension and Friction

Teststand 200 is a modified Atwood's Machine consisting of two nearly equal weights, Impulse Driver 10 (W1) and counterweight 214 (W2), connected together by wire 208 and slung over two pulley wheels 210 which in one embodiment have a radius of 55 mm and a thickness of 31.75 mm. The pulleys are made from a hard rubber material that prevents slippage of wire 208 and has steel ball bearings at its core.

Calculate pulley tension by: (assuming no inertia)[11].

[11] Holzner, Steven, PhD, (2011). Physics for Dummies, Second Edition, New Jersey, Wiley Publishing. ISBM: 978-470-90324-7. Chapter 12, page 240.

Στ=Iα where Στ means torque

In this case there are two torques $\tau_1$ and $\tau_2$ whose vectors are perpendicular to the plane of this page such that a positive value corresponds to a clockwise rotation. Solving for angular acceleration α and letting Στ be the sum of $\tau_1$ and $\tau_2$:

$$\alpha = \frac{\Sigma\tau}{I} = \frac{(\tau_1 + \tau_2)}{I}$$

Where α is the component of the pulley's angular acceleration and τ is the torque.

The two forces acting at a radius r are:
$\tau_1 = F_r$, with F as the force and r as the radius of the pulley
$\tau_2 = -T_r$, where T is the tension in the rope between the mass m and the pulley The pulley's support goes through the axis of rotation, so no torque comes from it.

Students need to work out the tension in the rope, T, which is providing torque $\tau_2$. The forces acting on Impulse Driver 18, m, are its weight acting downward and the tension in the rope acting upward. Using Newton's second law to write the following:

$-mg + T = ma$

Where a is acceleration of the Impulse Driver, m. To find tension solve for T:

$T = ma + mg$

Wire 208 is inextensible and the tangential acceleration is related to the linear acceleration by a=rα. Therefore, the acceleration of weight assembly 40 must be equal to the tangential acceleration of the edge of the pulley wheel, so α can be replaced and the tension in the wire becomes:

$$T = ma + mg$$
$$= m(r\alpha) + mg$$
$$= m(r\alpha) + g$$

Knowing the tension find $\tau_2$, which equals $-Tr$. It's known that $\tau_1$ equals $Fr$, so the total torque acting on the pulley wheel:

$$\tau_1 + \tau_2 = Fr - Tr$$
$$= Fr - m(r\alpha + g)r$$

Since the rotating part of the pulley is a circular disk of radius r and mass M, then you can look up the moment of inertia, which is $$I = \left(\frac{1}{2}\right)Mr^2.$$

Because the total torque is equal to the moment of inertia times the angular acceleration, you can write the following:

$$Fr - m(r\alpha + g)r = \frac{1}{2}Mr^2 a$$

Then you can rearrange this equation to give the angular acceleration, like so:

$$\alpha = \frac{F - mg}{\frac{1}{2}(M + 2m)r}$$

Now, we can insert the pulley's inertia into our calculations and derive formulas for the tensions in the two branches of wire and for the acceleration of the system.[12]

[12] Hartog, J. P. Den (1961). Mechanics. USA:McGraw-Hill. ISBN 0-486-60754-2, Problem 245, page 415.

$$T_1 = W\left(1 + \frac{w}{Den}\right)$$
$$T_2 = (W + w)\left(1 - \frac{w}{Den}\right)$$
$$\ddot{x} = g\frac{w}{w + 2W + W_p\left(\frac{k}{r}\right)^2} = g\frac{w}{Den}$$

Where: W=counterweight

K=spring constant w=Δ Impulse Driver weight

Den=density of pulley wheel

The upward torque of weight assembly 40 reduces the wire tension between impulse driver 10 and wheels 210 resulting in impulse driver 10 accelerating upward and counterweight 214 accelerating downward to a new balancing height.

Example of Testing

Experimental testing of Impulse Driver 10 shows that the sum of the upward pulses of an Impulse Driver exceeds the sum of the downward pulses. (See FIG. 7). The downward impulse, generated during the lower part of the cycle, does not cancel-out the upward impulse from the top of the cycle because of the changing tension on wire 208.

Specifically, in test GM034, weight assembly 40, weighing 476 grams, with motor 60 rotating at a rate of 37 rpm and motor 70 rotating at a rate of 334 rpm, lifted Impulse Driver 10 weighing 4.36 kg to a height of 6.35 cm.

In another test GM055 Impulse Driver 10 weighing 4.23 kg was lifted to a height of 10.16 cm in 70 seconds, with motor 60 rotating at a rate of 135 rpm and motor 70 rotating at a rate of 348 rpm.

During GM067 testing Impulse Driver 10 was repeatedly lifted to a height of 4.5 cm while motor 60 rotated at a rate of 33.6 rpms and motor 70 rotated at a rate of 300 rpms.

Computer Control

During testing of Impulse Driver 10, friction and mechanical imperfections suggested computer control for continuous symmetrical operation at Resonance.

Referring to FIG. 10, real-time signals from sensors 101, 102, and 103 are routed from interface board 230, through cables (not shown) to interface cable connectors 144 and to data collection module 138. Those signals and the marker-button 152 signal are sent to MPU module136 or to an (optional) external computer. Motors 60 and 70 can be manually controlled by motor speed controls 150, or by pre-programmed instructions downloaded into MPU 136 or by programs running in an external computer. Motor control signals are sent to motor drivers 134A and 134B and routed out of controller 120, through interface board 230, to stepper motor 60 and lower motor 70.

Computer control increases the efficiency of Impulse Driver 10 by eliminating the loss of pivoting periodicity due to Resonance dead-bands. Free software specifically developed for controlling chaotic systems has been tested.[13]

[13] Weeks, Eric R. and Burgess, John M. (1997). *Evolving artificial neural networks to control chaotic systems*. Center for Nonlinear Dynamics and Department of Physics, University of Texas at Austin.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. An educational tool for teaching principles of angular momentum, torque and linear force, comprising:
    a frame comprising an upper platform and a lower platform,
    an upper motor disposed on said upper platform,
    a lower motor disposed on said lower platform,
    a spindle assembly comprising a shaft comprising an upper end and a lower end, said upper end of said shaft being connected to an upper coupling and said lower end of said shaft being connected to a lower coupling, a turntable comprising a mounting pin extending from a top surface thereof, the mounting pin being disposed in a offset position relative to a center axis of said turntable, said lower coupling being connected to said turntable via said mounting pin, said shaft comprising an axle hole disposed along a length thereof, an axle positioned through said axle hole of said shaft, wherein said axle is freely rotatable about a longitudinal axis of rotation within said axle hole, a weight assembly fixedly attached to said axle, wherein said weight assembly is rotatable with said axle about said longitudinal axis of rotation, wherein said longitudinal axis of rotation is offset from the center of mass of said weight assembly, and wherein said upper motor is structured to drivingly rotate said upper coupling about an upper axis, and wherein said lower motor is structured to drivingly rotate said turntable about a lower axis.

2. The educational tool as recited in claim 1 wherein said upper coupling is rotated in a first direction about said upper axis and said turntable is rotated in a second direction about said lower axis, said first direction being opposite said second direction.

3. The educational tool as recited in claim 2 wherein said upper axis and said lower axis are aligned with one another wherein said upper coupling and said turntable rotate about the same axis.

4. The educational tool as recited in claim 1 wherein said weight assembly comprises a first half fixedly connected to a first end of said axle and a second half fixedly connected to a second end of said axle; each of said first half and said second half of said weight assembly comprising a semicircular weight connected to a support plate; said support plate comprising a channel within which said axle is fixedly mounted.

5. The educational tool as recited in claim 3 wherein rotation of said upper motor and said lower motor cause said weight assembly to torque upward at a greater radial distance, around said longitudinal axis of rotation, and said weight assembly torques downward around said longitudinal axis of rotation at a lesser radial distance.

6. The educational tool as recited in claim 3 wherein rotation of said upper coupling in said first direction and said turntable in said second direction causes said weight assembly and said axle to rotate and/or revolve about said longitudinal axis of rotation.

7. The educational tool as recited in claim 6 further comprising a plurality of roller assemblies mounted to said frame, and a plurality of guides aligned with said plurality of roller assemblies.

8. The educational tool as recited in claim 7 wherein said plurality of pulley assemblies comprise a plurality of upper roller assemblies mounted to said upper platform of said frame and a plurality of lower roller assemblies mounted to said lower platform of said frame.

9. The educational tool as recited in claim 8 wherein said plurality of roller assemblies are structured to travel along said plurality of guides while said frame exhibits a linear force.

10. The educational tool as recited in claim 9 further comprising a counterweight interconnected to said frame via at least one attachment wire.

11. The educational tool as recited in claim 10 further comprising a suspension assembly configured to support said at least one attachment wire along a length thereof.

12. The educational tool as recited in claim 11 wherein said weight of said counterweight is at least substantially equal to a weight of said frame.

* * * * *